(12) United States Patent
Pinon et al.

(10) Patent No.: US 12,535,983 B2
(45) Date of Patent: Jan. 27, 2026

(54) CROSS-PLATFORM SHARING OF DISPLAYED CONTENT FOR ELECTRONIC DEVICES

(71) Applicant: Apple Inc., Cupertino, CA (US)

(72) Inventors: Olivier Pinon, Santa Clara, CA (US); Afshin Taghavi Nasrabadi, Los Gatos, CA (US); Maneli Noorkami, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/441,986

(22) Filed: Feb. 14, 2024

(65) Prior Publication Data
US 2024/0296005 A1 Sep. 5, 2024

Related U.S. Application Data

(60) Provisional application No. 63/449,312, filed on Mar. 1, 2023.

(51) Int. Cl.
*G06F 3/14* (2006.01)
*G06T 19/00* (2011.01)

(52) U.S. Cl.
CPC .......... *G06F 3/1454* (2013.01); *G06T 19/006* (2013.01)

(58) Field of Classification Search
CPC ..... G06F 3/1454; G06F 3/147; G06T 19/006; G09G 3/003; G09G 2320/02; G09G 2320/0242; G09G 2320/0271; G09G 2340/0492; G09G 2354/00; G09G 2370/20; G09G 2370/04; G09G 2370/042
See application file for complete search history.

(56) References Cited

U.S. PATENT DOCUMENTS

| | | |
|---|---|---|
| 8,965,349 B2 | 2/2015 | Kieft et al. |
| 9,716,720 B2 | 7/2017 | Adams et al. |
| 9,740,507 B2 | 8/2017 | Pinto et al. |
| 2006/0187305 A1 | 8/2006 | Trivedi |
| 2009/0055542 A1 | 2/2009 | Zhao et al. |
| 2009/0241104 A1 | 9/2009 | Amiga |

(Continued)

FOREIGN PATENT DOCUMENTS

EP 3128413 A 2/2017

OTHER PUBLICATIONS

Extended European Search Report from European Patent Application No. 24160199.6, dated Apr. 30, 2024, 12 pages.

(Continued)

*Primary Examiner* — Bryan Earles
(74) *Attorney, Agent, or Firm* — BAKERHOSTETLER

(57) ABSTRACT

Cross-platform sharing of displayed content is provided. In one or more implementations, cross-platform sharing of display content may include displaying a first rendering of display content with a first display of a first device, and, responsive to a request to capture and/or share the displayed content, generating a second rendering of the display content, the second rendering different from the first rendering. The second rendering may be different from the first rendering in such a way that, when the second rendering is displayed by a second display of a second device having a different form factor and/or display technology, the displayed second rendering accurately represents the perceived view of the user of the first device.

17 Claims, 15 Drawing Sheets

(56) References Cited

U.S. PATENT DOCUMENTS

| | | |
|---|---|---|
| 2011/0289410 A1 | 11/2011 | Paczkowski |
| 2012/0019433 A1 | 1/2012 | Inagaki |
| 2014/0229542 A1 | 8/2014 | Yu |
| 2014/0361977 A1* | 12/2014 | Stafford ................ A63F 13/212 |
| | | 345/156 |
| 2016/0210108 A1 | 7/2016 | Roytblat |
| 2018/0077409 A1* | 3/2018 | Heo ....................... G09G 3/003 |
| 2018/0219975 A1* | 8/2018 | Leppänen ............... G06F 3/012 |
| 2019/0199993 A1* | 6/2019 | Babu J D ............... G06T 15/08 |
| 2019/0325658 A1* | 10/2019 | Park .......................... G06T 7/70 |
| 2021/0352120 A1 | 11/2021 | Masi |
| 2022/0244903 A1 | 8/2022 | Taylor et al. |

OTHER PUBLICATIONS

European Patent Application No. 24160199.6, Office Action dated May 12, 2025, 14 pages.

\* cited by examiner

CROSS-PLATFORM SHARING OF DISPLAYED CONTENT FOR ELECTRONIC DEVICES

CROSS REFERENCE TO RELATED APPLICATIONS

This application claims the benefit of priority to U.S. Provisional Patent Application No. 63/449,312, entitled, "CROSS-PLATFORM SHARING OF DISPLAYED CONTENT FOR ELECTRONIC DEVICES", filed on Mar. 1, 2023, the disclosure of which is hereby incorporated herein in its entirety.

TECHNICAL FIELD

The present description relates generally to electronic devices including, for example, cross-platform sharing of displayed content for electronic devices.

BACKGROUND

Electronic devices typically utilize arrays of display pixels to display content. Some electronic devices provide the ability to record the values of the display pixels at a given time, or over a period of time. These recorded values of the display pixels may be stored or shared as a screen capture image or a screen sharing image or video. The recorded values of the display pixels can be exactly replicated using display pixels of another electronic device, so that a user of the other electronic device can view the content as it was displayed by the display pixels of the recording device.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
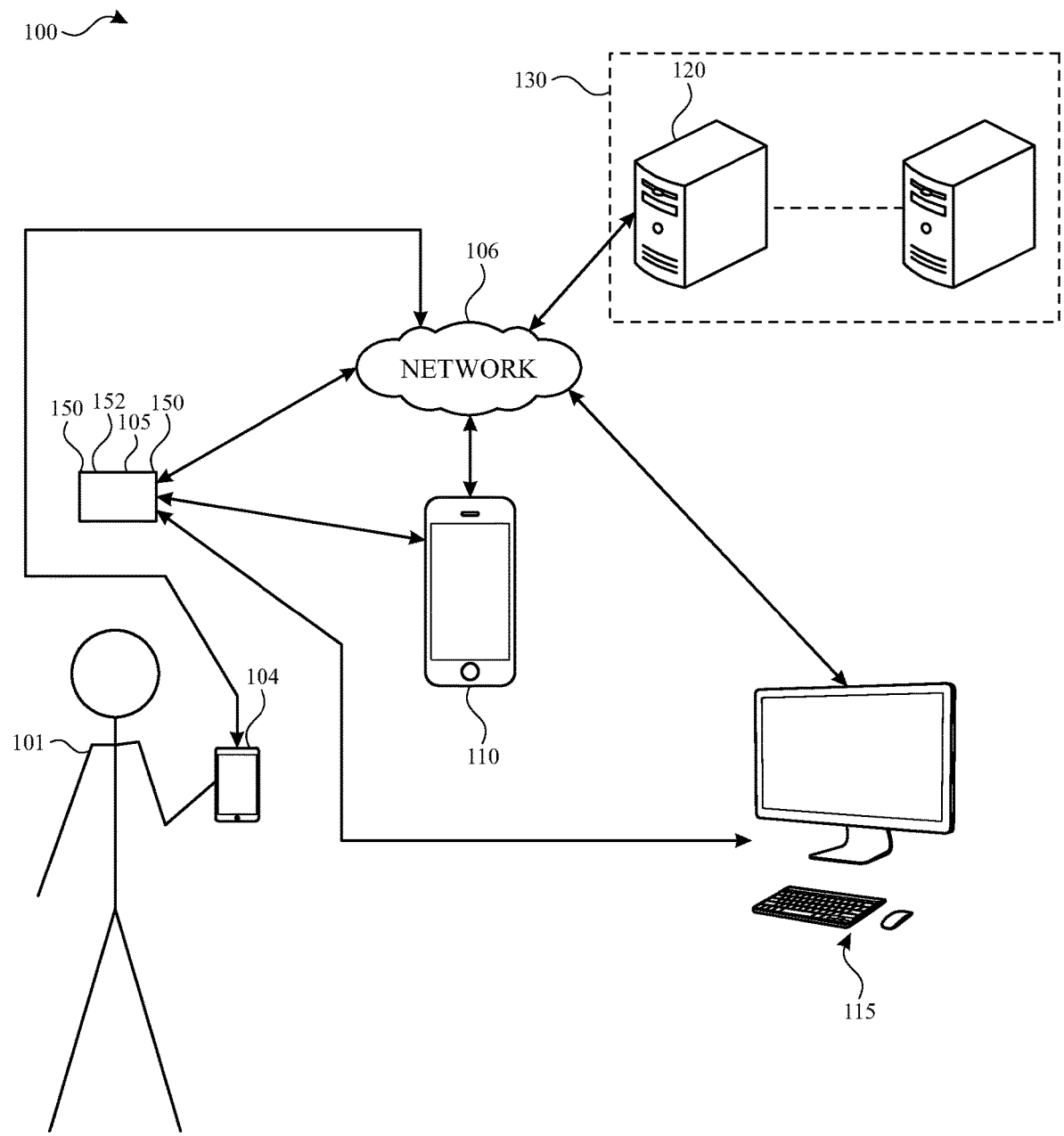
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

A device having a display that is capable of generating an XR environment may distort, warp, duplicate (e.g., for stereo viewing), foveate, darken, tone map, vignette, or otherwise process display content in a way that is specific to that type of display, and/or that is specific to generating a three-dimensional XR viewing experience with perceived depth to the displayed content. In a use case in which the user of such a device wishes to capture and/or share some or all of what they are viewing in the three-dimensional XR environment, simply recording the values of the display pixels of the display may only result in an accurate representation of the user's viewing experience if the recorded values of the display pixels are replayed on the same display, or on another display having the same form factor and display technology.

However, a user may also wish to view the captured viewing experience (and/or send the captured viewing experience to another person for viewing), on a device with a different form factor and/or that does not include a display capable of displaying a three-dimensional XR environment. For example, the user may wish to view or share a portion of their three-dimensional XR viewing experience on a display configured for two-dimensional viewing, such as a display of a smartphone, a tablet device, a laptop computer, a television, a desktop computer, or the like. In these use cases, replaying recorded pixel values from the recording device may produce warped, difficult-to-view, or even unintelligible viewing content on the device with the display configured for two-dimensional viewing.

Implementations of the subject technology described herein provide for sharing of displayed content between devices having different form factors and/or display technologies (e.g., cross-platform sharing of display content). For example, a device that is displaying a first rendering of display content may generate, while displaying the first rendering, a second rendering of the same display content, the second rendering different from the first rendering. The second rendering may be configured for viewing on a second device having a different form factor and/or display technology. As described in further detail hereinafter, the second rendering may be different from the first rendering in such a way that, when viewed on the second device having a different form factor and/or display technology, the second rendering accurately represents the perceived view of the user of the first device when viewing the first rendering on the first device.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, an electronic device 110, an electronic device 115, and a server 120. For explanatory purposes, the system architecture 100 is illustrated in FIG. 1 as including the electronic device 105, the electronic device 110, the electronic device 115, and the server 120; however, the system architecture 100 may include any number of electronic devices and any number of servers or a data center including multiple servers.

The electronic device 105 may be smart phone, a tablet device, or a wearable device such as a head mountable portable system, that includes a display system capable of presenting a visualization of an extended reality environment to a user 101. The electronic device 105 may be powered with a battery and/or any other power supply. In an example, the display system of the electronic device 105 provides a stereoscopic presentation of the extended reality environment, enabling a three-dimensional visual display of a rendering of a particular scene, to the user. In one or more implementations, instead of, or in addition to, utilizing the electronic device 105 to access an extended reality environment, the user may use a handheld electronic device 104, such as a tablet, watch, smartphone, mobile device, and the like.

The electronic device 105 may include one or more cameras such as camera(s) 150 (e.g., visible light cameras, infrared cameras, etc.) Further, the electronic device 105 may include various sensors 152 including, but not limited to, cameras, image sensors, touch sensors, microphones, inertial measurement units (IMU), heart rate sensors, temperature sensors, Lidar sensors, radar sensors, sonar sensors, GPS sensors, Wi-Fi sensors, near-field communications sensors, etc.) Moreover, the electronic device 105 may include hardware elements that can receive user input such as hardware buttons or switches. User input detected by such sensors and/or hardware elements correspond to various input modalities for initiating capture, storage, and/or sharing of some or all of a given extended reality environment displayed by a display of the electronic device 105. For example, such input modalities may include, but are not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating physical and/or virtual buttons or switches, etc. The electronic device 105 may also detect and/or classify physical objects in the physical environment of the electronic device 105.

The electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power limitations of the electronic device 105 such as available battery power of the device. In response to power limitations, the electronic device 105 may deactivate certain sensors within the device itself to preserve battery power.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the extended reality environment may be offloaded to the base device thereby reducing processing burdens on the electronic device 105. For instance, in an implementation, the electronic device 105 works in conjunction with the electronic device 110 or the electronic device 115 to generate an extended reality environment including physical and/or virtual objects that enables different forms of interaction (e.g., visual, auditory, and/or physical or tactile interaction) between the user and the extended reality environment in a real-time manner. In an example, the electronic device 105 provides a rendering of a scene corresponding to the extended reality environment that can be perceived by the user and interacted with in a real-time manner. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

The electronic device 105 may also detect events that have occurred within the scene of the extended reality environment. Examples of such events include detecting a presence of a particular person, entity, or object in the scene. Detected physical objects may be classified by electronic device 105, electronic device 110, and/or electronic device 115 and the location, position, size, dimensions, shape, and/or other characteristics of the physical objects can be used to provide physical anchor objects to an XR application generating virtual content, such as a UI of an application, for display within the XR environment.

It is further appreciated that the electronic device 110 and/or the electronic device 115 can also generate such extended reality environments either working in conjunction with the electronic device 105 or independently of the electronic device 105.

The network 106 may communicatively (directly or indirectly) couple, for example, the electronic device 105, the electronic device 110 and/or the electronic device 115 with the server 120 and/or one or more electronic devices of one or more other users. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a display. In one or more implementations, the electronic device 110 may not include a touchscreen but may support touchscreen-like gestures, such as in an extended reality environment. In one or more implementations, the electronic device 110 may include a touchpad. In FIG. 1, by way of example, the electronic device 110 is depicted as a mobile smartphone device with a touchscreen. In one or more implementations, the electronic device 110, the handheld electronic device 104, and/or the electronic device 105 may be, and/or may include all or part of, the electronic system discussed below with respect to FIG. 15. In one or more implementations, the electronic device 110 may be another device such as an Internet Protocol (IP) camera, a tablet, or a peripheral device such as an electronic stylus, etc.

The electronic device 115 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 15.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for extended reality environments. In an implementation, the server 120 may function as a cloud storage server that stores any of the aforementioned extended reality content generated by the above-discussed devices and/or the server 120.

Figure 2:
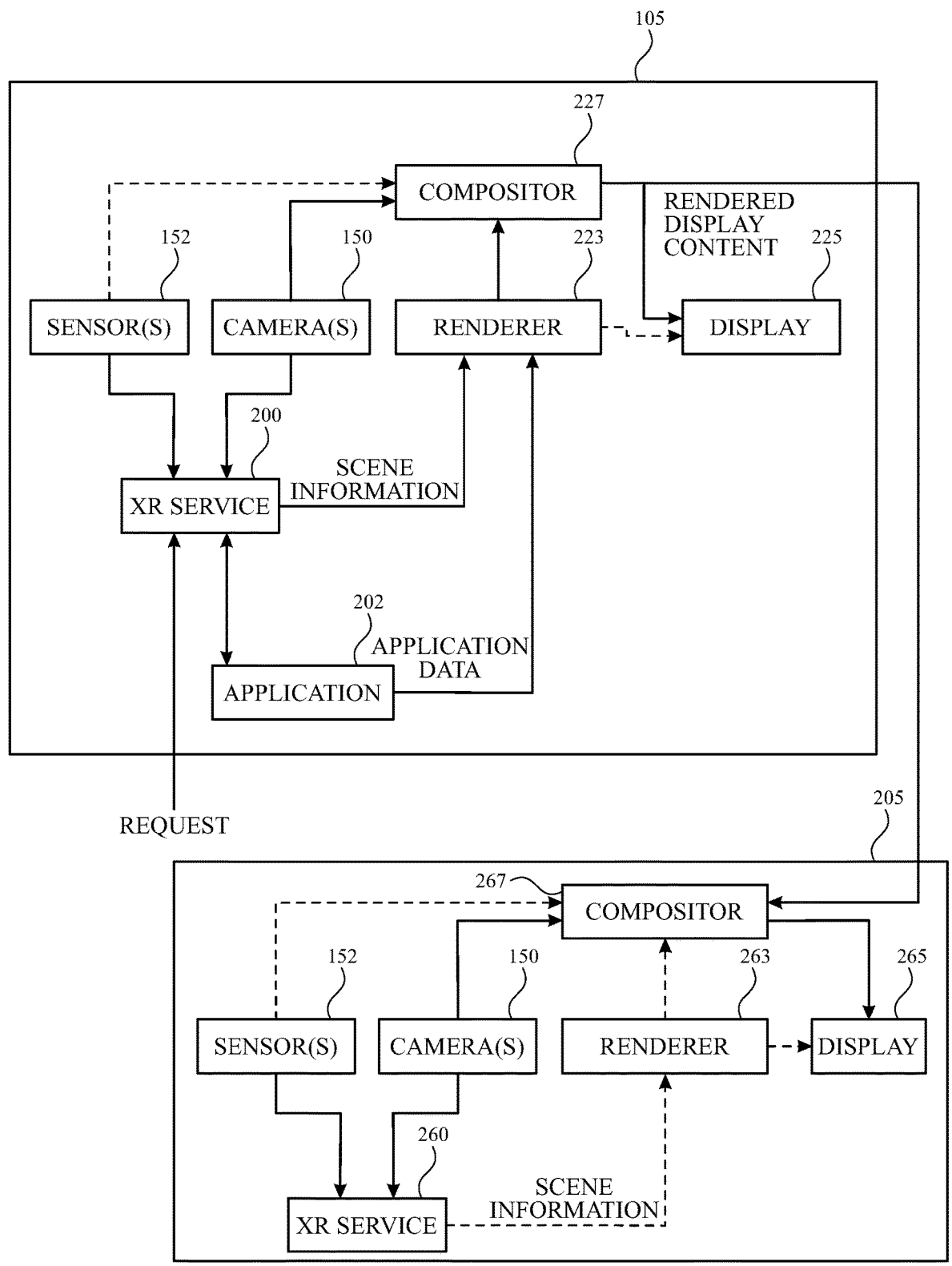
FIG. 2 illustrates an example computing devices that may implement aspects of the subject technology.

FIG. 2 illustrates an example architecture that may be implemented by the electronic device 105 and another electronic device 205 (e.g., another electronic device 105) in accordance with one or more implementations of the subject technology. For explanatory purposes, portions of the architecture of FIG. 2 is described as being implemented by the electronic device 105 of FIG. 1, such as by a processor and/or memory of the electronic device; however, appropriate portions of the architecture may be implemented by any other electronic device, including the electronic device 110, electronic device 115, and/or server 120. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Various portions of the architecture of FIG. 2 can be implemented in software or hardware, including by one or more processors and a memory device containing instructions, which when executed by the processor cause the processor to perform the operations described herein. In the example of FIG. 2, an application such as application 202 provides application data to a renderer 223 for rendering of a UI of the application 202. The application data may include application-generated content (e.g., windows, buttons, tools, etc.) and/or user-generated content (e.g., text, images, etc.), and information for rendering the content in the UI. Renderer 223 renders the UI for display by a display such as display 225 of the electronic device 105.

In the example of FIG. 2, additional information is provided for display of the UI of the application 202 in a three-dimensional (e.g., XR) scene. In the example of FIG. 2, sensor(s) 152 may provide environment information (e.g., depth information from one or more depth sensors) for a physical environment of the electronic device 105 to an XR service 200. Camera(s) 150 may also provide images of the physical environment to XR service 200. XR service 200 may generate three-dimensional scene information, such as three-dimensional map or reconstruction, of some or all of the physical environment of electronic device 105 using the environment information (e.g., the depth information and/or the images) from sensor(s) 152 and camera(s) 150.

As illustrated in FIG. 2, application 202 may request and/or receive information (e.g., anchoring information, physical environment information, user information, etc.) from the XR service 200 for generating UI content for display. As examples, application 202 may be a gaming application, a media player application, a content-editor application, a training application, a simulator application, or generally any application that provides a UI for display at a location that depends on the physical environment, such as by anchoring the UI to a physical object anchor.

A physical object anchor can be a general physical object such as a horizontal planar surface (e.g., a surface of a floor or a tabletop), a vertical planar surface (e.g., a surface of a wall), or a specific physical object such a table, a wall, a television stand, a couch, a refrigerator, a desk, a chair, etc. Application 202 may include code that, when executed by one or more processors of electronic device 105, generates application data, for display of a UI of the application on, near, attached to, or otherwise associated with the physical object anchor.

Once the application data has been generated, the application data can be provided to the XR service 200 and/or the renderer 223, as illustrated in FIG. 2. Scene information such as a depth map of the physical environment, images of the physical environment, and/or object information for detected objects in the physical environment, can also be provided to renderer 223. Renderer 223 can then render the scene information from the XR service 200 and/or the application data from application 202 for display by display 225 of electronic device 105. For example, the UI of application 202 may be rendered for display by the display 225, such that a user of the electronic device 105 viewing the display 225 perceives the UI of the application 202 at a location, remote from the display 225, in an three-dimensional XR environment. For example, the renderer 223 may render the UI of the application 202 at one or more appropriate locations on the display 225, such that the UI appears, to a viewer of the display 225, to be at a location, remote from the display 225, of a physical anchor object or other anchor provided by XR service 200.

Display 225 may be, for example, an opaque display, and camera(s) 150 may be configured to provide a pass-through video feed to the opaque display. The UI may be rendered for display at a location on the display corresponding to the displayed location of the physical anchor object in the pass-through video by overlaying or otherwise integrating the UI on or with the pass-through video images from the camera(s) 150. Display 225 may be, as another example, a transparent or translucent display. The UI may be rendered for display at a location on the display corresponding to a direct view, through the transparent or translucent display, of the physical anchor object, such that a user viewing the transparent or translucent display perceives the UI to be at a location, remote from the transparent or translucent display, in the physical environment of the user.

As shown, electronic device 105 can also include a compositor 227 that composites images of the physical environment, based on images from camera(s) 150, for display together with the rendered UI from renderer 223. For example, compositor 227 may be provided in an electronic device 105 that includes an opaque display, to provide pass-through video to the display. In an electronic device 105 that is implemented with a transparent or translucent display that allows the user to directly view the physical environment, compositor 227 may be omitted or unused in some circumstances, or may be incorporated in renderer 223. Although the example of FIG. 2 illustrates a renderer 223 that is separate from XR service 200, it should be appreciated that XR service 200 and renderer 223 may form a common service and/or that rendering operations for rendering content for display can be performed by the XR service 200. Although the example of FIG. 2 illustrates a renderer 223 that is separate from application 202, it should be appreciated that, in some implementations, application 202 may render content for display by display 225 without using a separate renderer.

As shown in FIG. 2, the electronic device 105 may receive a request (e.g., at the XR service 200, such as via one or more processors and/or input components of the electronic device 105) to capture some or all of the content being viewed by a user (e.g., user 101) of the electronic device 105 that is viewing the display 225. For example, the user of the electronic device 105 may be viewing a three-dimensional XR environment (e.g., an MR environment, a VR environment, and/or an MR environment) by looking at display content that has been rendered by the renderer 223 and displayed by the display 225, and may desire to record and/or share some or all of the three-dimensional XR environment that the user is viewing. As examples, the request may be a screen-capture or screen-recording request in which the user requests to capture and store some or all of the displayed content that the user is viewing, a screen-share request in which the user requests to share some or all of the displayed content that the user is viewing for display at another device, or an application-casting request in which the user requests to display a copy of the UI of the application 202 at another deice that does not have the application 202 installed thereon.

In the example of FIG. 2, the request may be a request to share the displayed content that the user is viewing on the display 225 with another electronic device 205 that has the same form factor and/or the same display technology as the electronic device 105. For example, both the electronic device 105 and the other electronic device 205 may be head mountable devices having a stereoscopic display (e.g., the display 225 of the electronic device 105 and the display 265 of the other electronic device 205). In this example, the electronic device 105 may capture the displayed content being viewed by the user of the electronic device 105 by recording the display pixel values (or other display element values) being displayed by the display 225 (e.g., by recording the same rendering that is being displayed by the display 225). As shown, in this example, the electronic device 105 can share the captured display content by providing the same rendering that is being provided to the display 225 to the other electronic device 205, for display on the display 265 of the other electronic device 205. In the example of FIG. 2, the same rendering that is generated by the compositor 227 (e.g., by combining a rendered image from the renderer 223 or with one or more images from the camera(s) 150) is provided to a compositor 267 of the other electronic device 205, and then provided to the display 265 by the compositor 267. However, this is merely illustrative, and the same rendering that is displayed by the display 225 can be provided to an XR service 260, a renderer 263, or directly to the display 265 of the other electronic device 205. In other examples as described in further detail hereinafter, the electronic device 105 may be provided with one or more separate components (e.g., a second renderer and/or a second compositor) that generates composited rendered display content for the other electronic device 205. In the example of FIG. 2, because the other electronic device 205 has the same form factor as the electronic device 105, and/or the display 265 of the other electronic device 205 is the same display technology as the display 225, re-displaying the same rendering on the display 265 may result in the same content being displayed in the same way on both devices. However, even when the same display content is displayed by the display 265 having the same display technology, the viewing experience for the user of the other electronic device 205 may not match the viewing experience of the user of the electronic device 105, as the motion of the user of the other electronic device 205 and/or the other electronic device 205, and/or the viewing direction with the other electronic device 205 can be different from that of the electronic device 105. As discussed in further detail hereinafter, a subset of the rendered content at the electronic device 105, such as a two-dimensional subset of the content rendered at the electronic device 105 may be provided to the other electronic device 205 in response to a request to share the displayed content that the user is viewing on the display 225.

Figure 3:
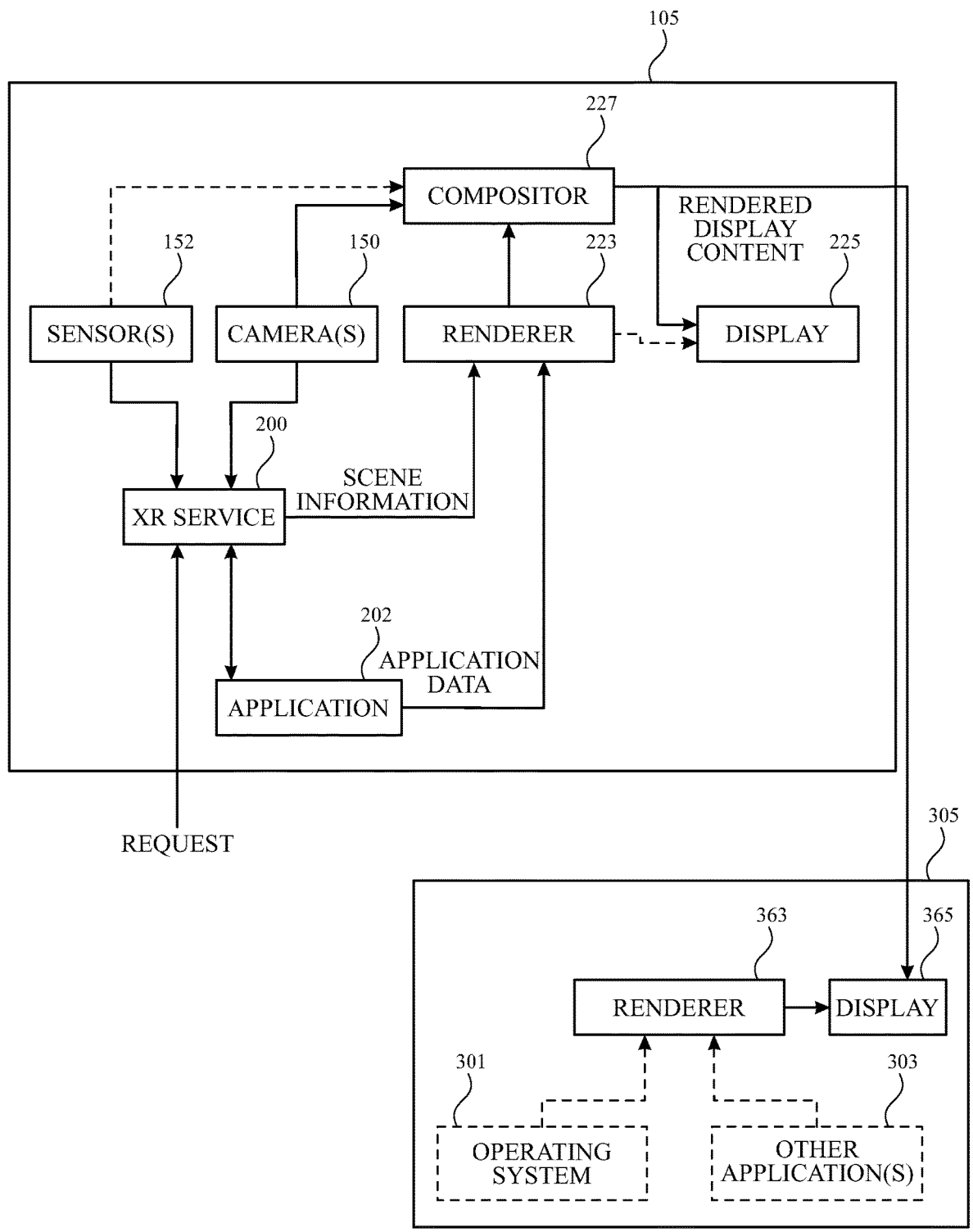
FIG. 3 illustrates another example of computing devices that may implement aspects of the subject technology.

However, as described herein, the user of the electronic device 105 may desire to share the display content on the display 225 with another electronic device having a different form factor and/or a different display technology. For example, FIG. 3 illustrates a use case in which the electronic device 105 receives a request to capture the displayed content that the user is viewing on the display 225 with another electronic device 305 that has a different form factor and/or a different display technology than the electronic device 105. For example, the electronic device 105 may be a head mountable device having a stereoscopic display (e.g., in which the two eyes of the user view different display pixels or display elements to generate a three-dimensional effect), and the other electronic device 305 may be a handheld, laptop, desktop, or wall-mountable device having display 365 configured to display two-dimensional scenes (e.g., in which the same pixel or display element is concurrently viewed by both eyes of the user). In the example of FIG. 3, the other electronic device 305 also does not have the application 202 installed, and may also be provided without an XR service, a compositor, sensors and/or cameras, in various implementations. As examples, the other electronic device 305 may be an implementation of the handheld electronic device 104, the electronic device 110, or the electronic device 115 of FIG. 1. As shown in FIG. 3, the other electronic device 305 may include an operating system 301 and/or one or more other applications 303 that provide display content to a renderer 363 for two-dimensional display on the display 365.

In the example of FIG. 3, as in the example of FIG. 2, the same rendering that is displayed by the display 225 of the electronic device 105 (e.g., as generated by the compositor 227, by combining a rendered image from the renderer 223 with one or more images from the camera(s) 150) is provided for display by the display 365 of the other electronic device 305. In other examples described in further detail hereinafter, the electronic device 105 may be provided with one or more separate components (e.g., a second renderer and/or a second compositor) that generates composited rendered display content for the other electronic device 305. In the example of FIG. 3, because the rendering that is displayed by the display 225 of the electronic device 105 may be tailored for that display and/or for a three-dimensional viewing experience (e.g., on a stereoscopic display), the result of displaying the same rendering on the display 365 of the other electronic device 105 may include cross-platform artifacts that make the viewed content on the display 365 distorted, warped, too bright, too dark, miscolored, blurred or otherwise unrepresentative of the display content viewed by the user of the electronic device 105.

Figure 4:
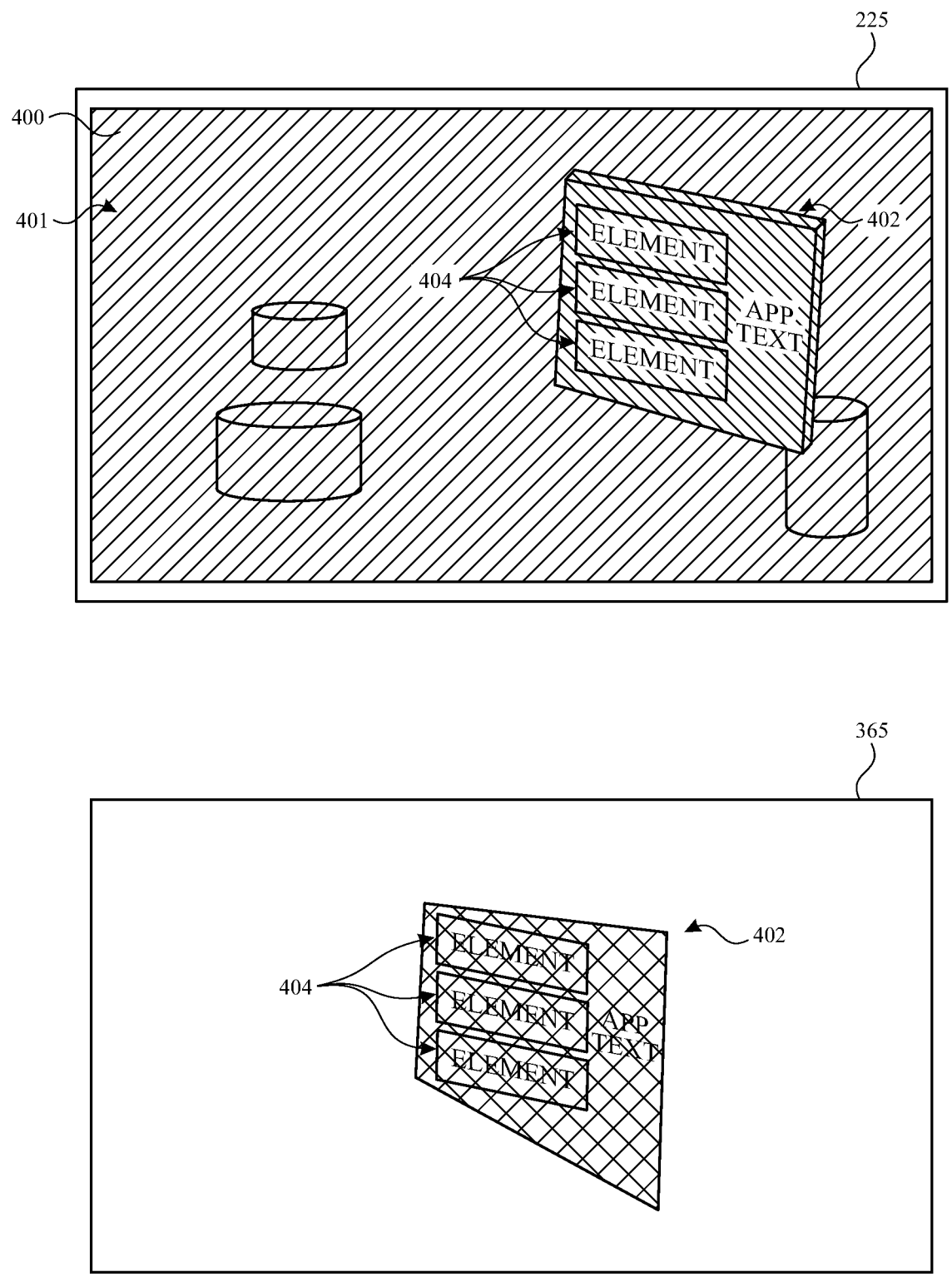
FIG. 4 illustrates an example of display content that is displayed by a first device being replicated using a display of another device in accordance with aspects of the subject technology.
Figure 5:
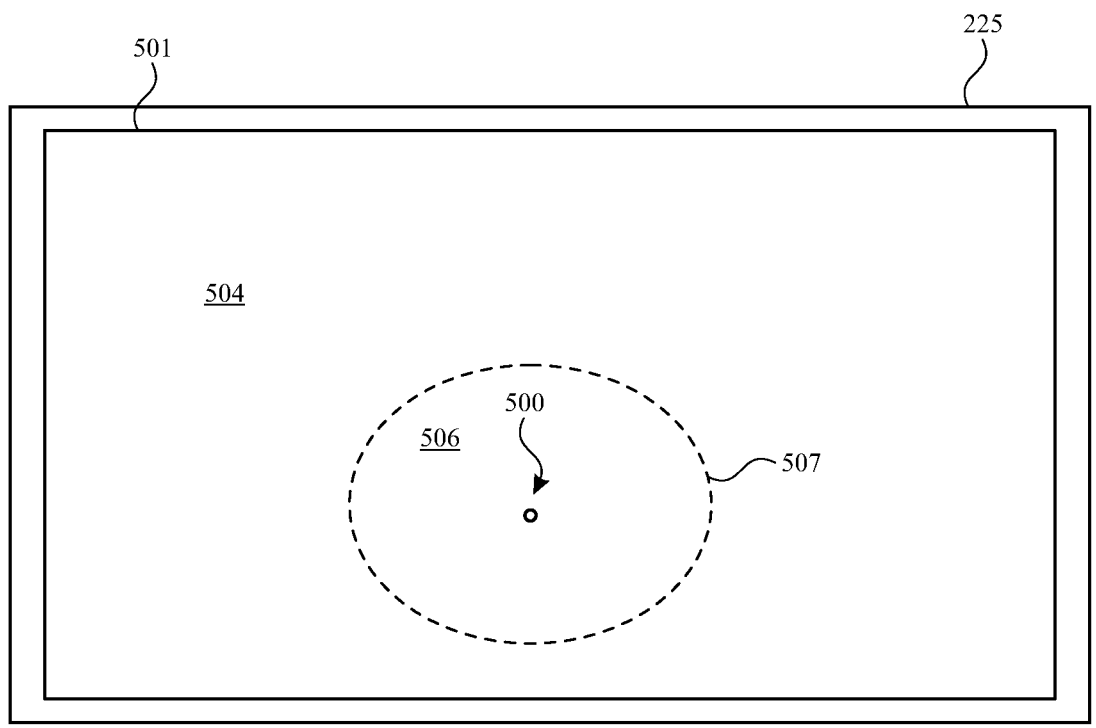
FIG. 5 illustrates an example of a foveated display frame that is displayed by a first device being replicated using a display of another device in accordance with aspects of the subject technology.
Figure 5:
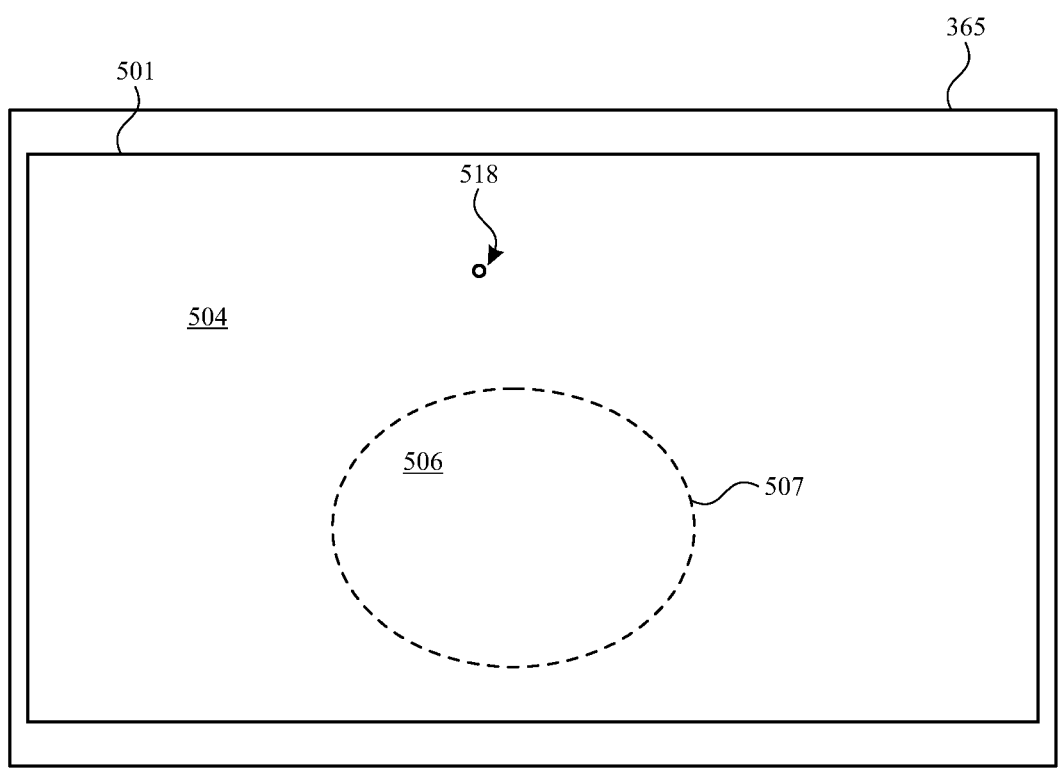

For example, FIGS. 4 and 5 illustrate examples of cross-platform artifacts that can occur if the same rendering is displayed by the display 225 of the electronic device 105 and the display 365 of the other electronic device 305. In the example of FIG. 4, the display 225 of the electronic device 105 displays an XR scene 400 that includes a background 401 and a UI 402 of an application (e.g., application 202). As examples, the background 401 may be an image of a portion of the physical environment of the electronic device 105 on which the UI 402 is overlayed, or may be a direct view of the portion of the physical environment through a portion of a transparent or translucent display on which the UI 402 is displayed.

In this example, the user of the electronic device 105 may request to cast the UI 402 of the application to the display 365 of the other electronic device 305. However, in this example, the UI 402 is presented to appear at a perspective viewing angle that appears to extend away from the user into the physical environment at one end. Moreover, the color, brightness, tone mapping, and/or other features of the UI 402 as displayed on the display 225 may be set for viewing in the display environment of the electronic device 105 (e.g., in a darkened environment in which a head mountable device blocks ambient light from reaching the user's eyes). For these reasons, displaying the same rendering that is displayed on the display 225 can cause the UI 402 to appear distorted and/or dark on the display 365, as shown in FIG. 4. In this example, the UI elements 404 that are visible in the UI 402 on the display 225 may appear distorted and/or unreadable in when displayed, based on the same rendering, on the display 365.

In the example of FIG. 5, a foveated rendering of an XR scene 501 is displayed on the display 225. For example, in the foveated rendering of the XR scene 501 on the display 225, a portion 506 of the XR scene 501 has a content resolution that is higher than the content resolution in a portion 504 outside of a boundary 507 of the portion 506. In this example, the portion 506 of the XR scene 501 is centered on a gaze location 500. For example, the gaze location 500 may be a location at which a user of the electronic device 105 is gazing at the time the XR scene 501 is rendered and/or displayed. In one or more implementations, as the gaze location 500 moves, the electronic device 105 may track and update the locations and/or shapes of the portion 506 and the portion 504 to continue to be substantially centered on the gaze location 500. Because the user of the electronic device 105 is gazing at the gaze location 500, the reduced resolution of the portion 504 of the XR scene 501 may not be noticeable to the user. In this example, the user of the electronic device 105 may request to share the XR scene 501 being viewed by the user of the electronic device 105 on the display 225, to the display 365 of the other electronic device 305.

However, as illustrated in FIG. 5, if the same foveated rendering of the XR scene 501 is displayed on the display 365 of the other electronic device 305, the user of the other electronic device 305 may gaze at a different gaze location 518 on the display 365. In this exemplary use case, the user of the other electronic device 305 is viewing the reduced resolution content in the portion 504, which may be blurred in the foveated rendering.

Figure 6:
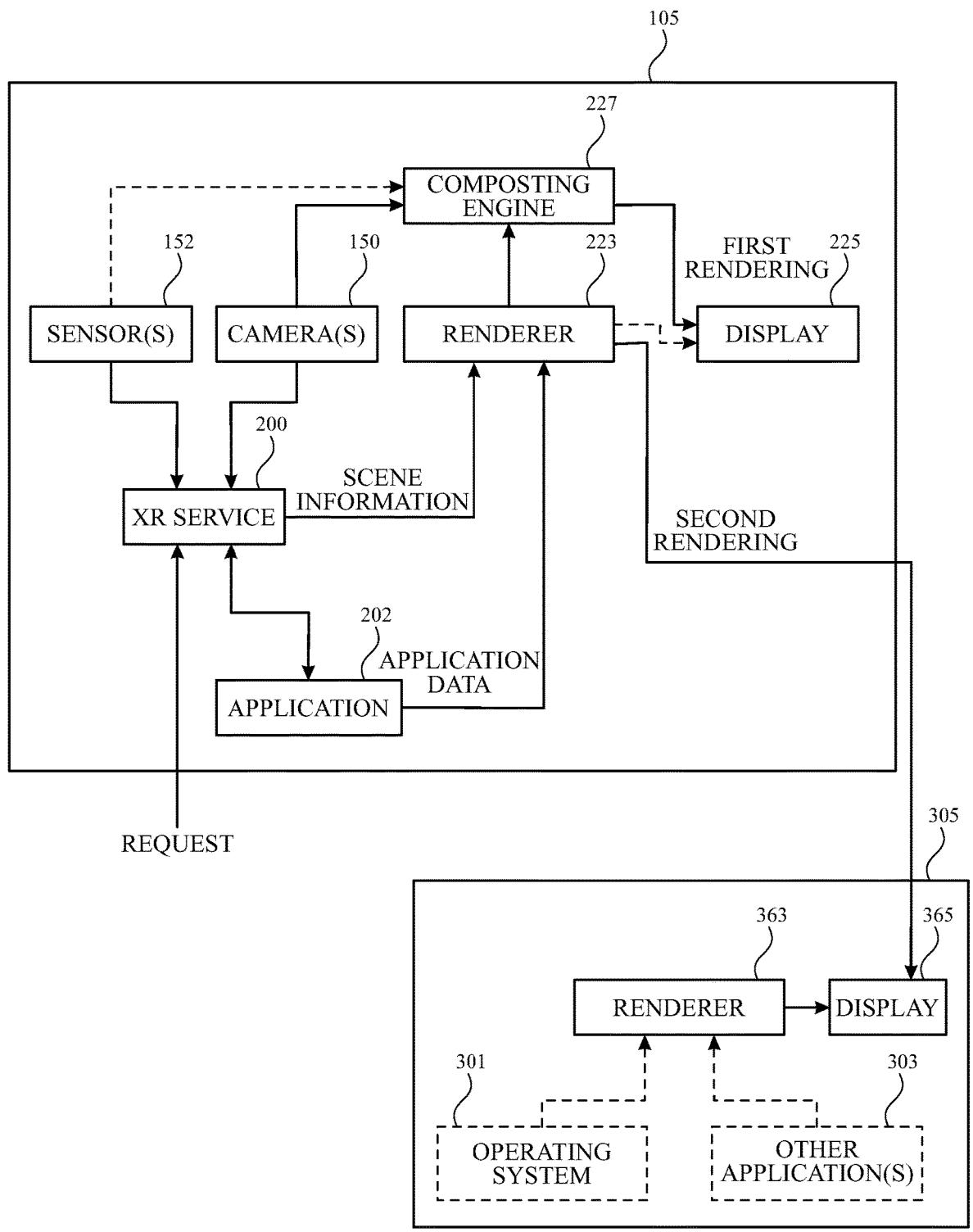
FIG. 6 illustrates an example of a first electronic device generating a first rendering of display content for display at the first electronic device and a second rendering of the display content for display at a second electronic device in accordance with aspects of the subject technology.

In order to, for example, mitigate or remove the cross-platform artifacts illustrated in FIGS. 4 and 5, and/or other cross-platform artifacts (e.g., due to image warping, tone mapping, debugging, occlusion, vignetting, etc.), when a request is received to capture and/or share the display content being viewed by the user of the electronic device 105 on the display 225 is received by the electronic device 105, the electronic device 105 may generate a second, separate rendering of the display content that is different from the rendering that is displayed on the display 225. For example, FIG. 6 illustrates an implementation in which, responsive to a request to capture and/or share the display content being viewed by the user of the electronic device 105 on the display 225 when a first rendering of the display content is displayed by the display 225, the electronic device (e.g., the renderer 223 and/or the XR service 200) may generate a second rendering, different from the first rendering. As shown in the example of FIG. 6, the second rendering may be provided to another electronic device, such as the other electronic device 305, for display on a display 365 having a different display technology and/or form factor.

Figure 7:
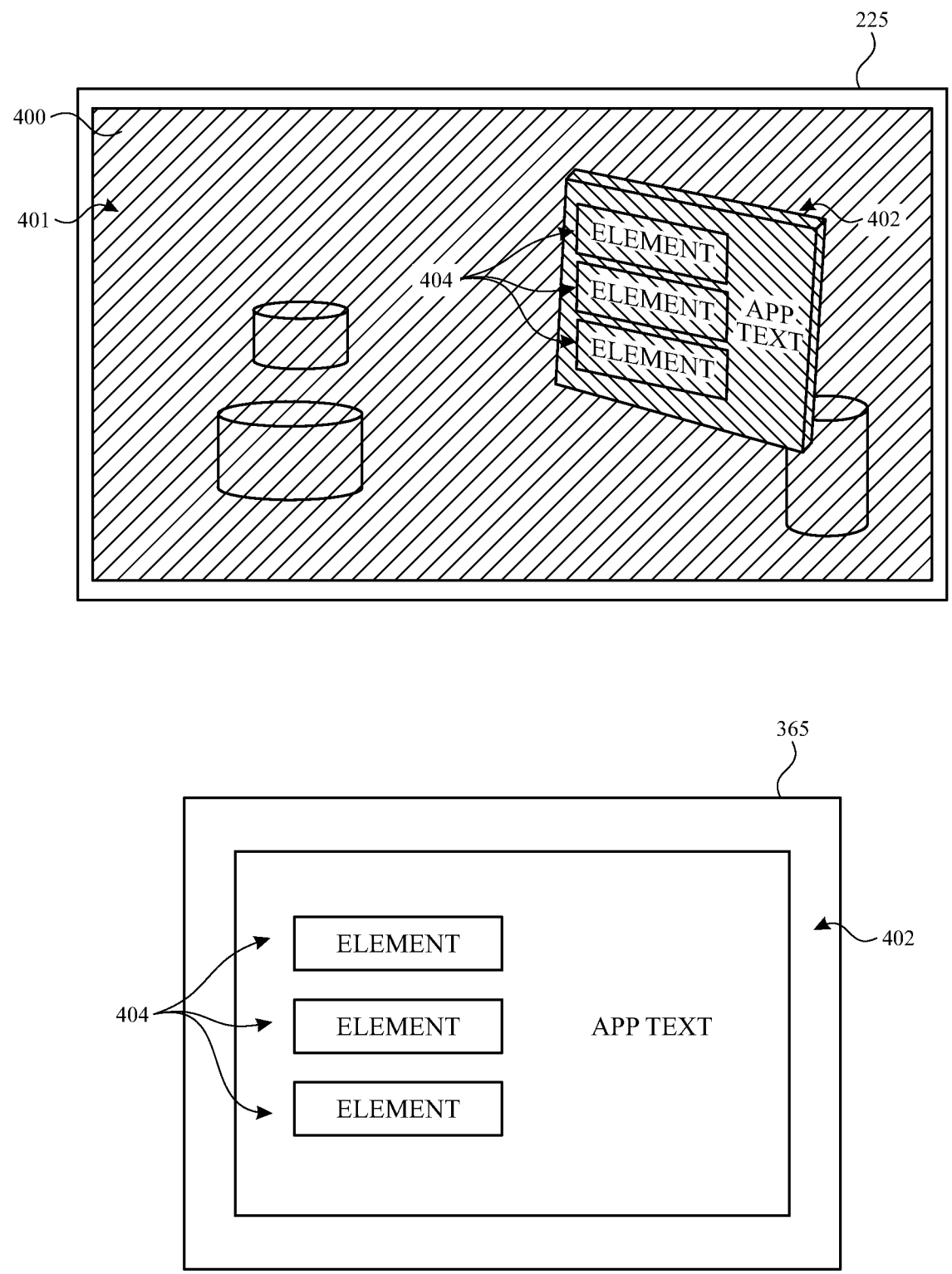
FIG. 7 illustrates an example of a first rendering of display content that is displayed by a first device and a second rendering of the display content being displayed by a display of another device in accordance with aspects of the subject technology.
Figure 8:
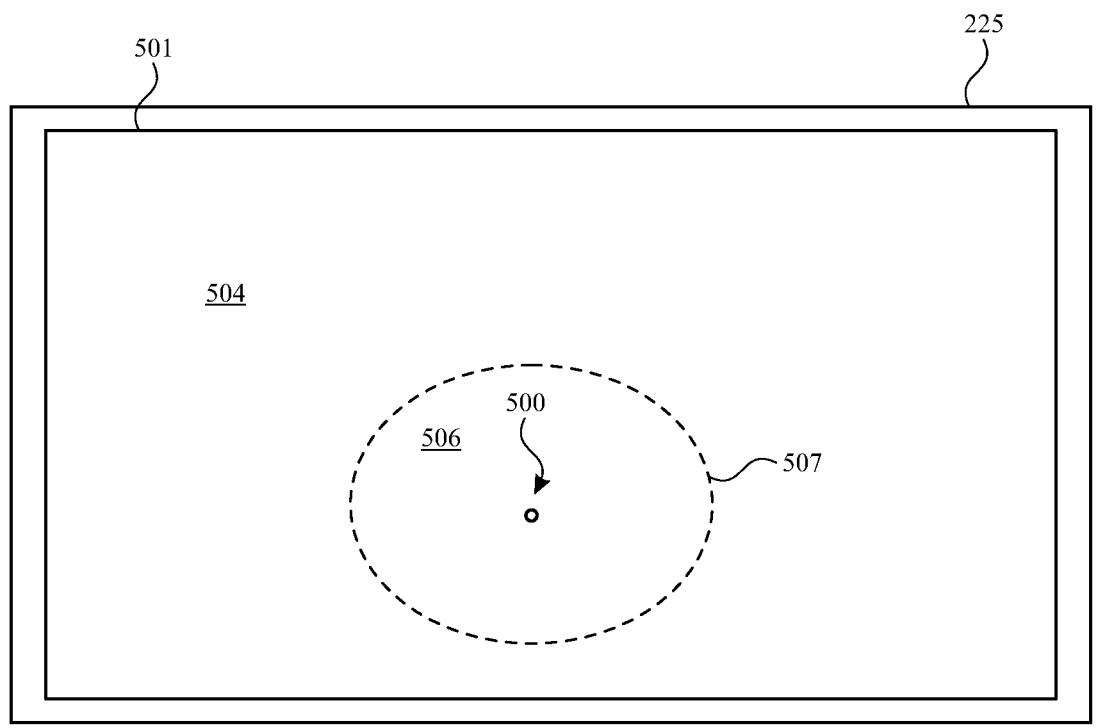
FIG. 8 illustrates an example of a foveated rendering of display content that is displayed by a first device and a second, non-foveated, rendering of the display content being displayed by a display of another device in accordance with aspects of the subject technology.
Figure 8:
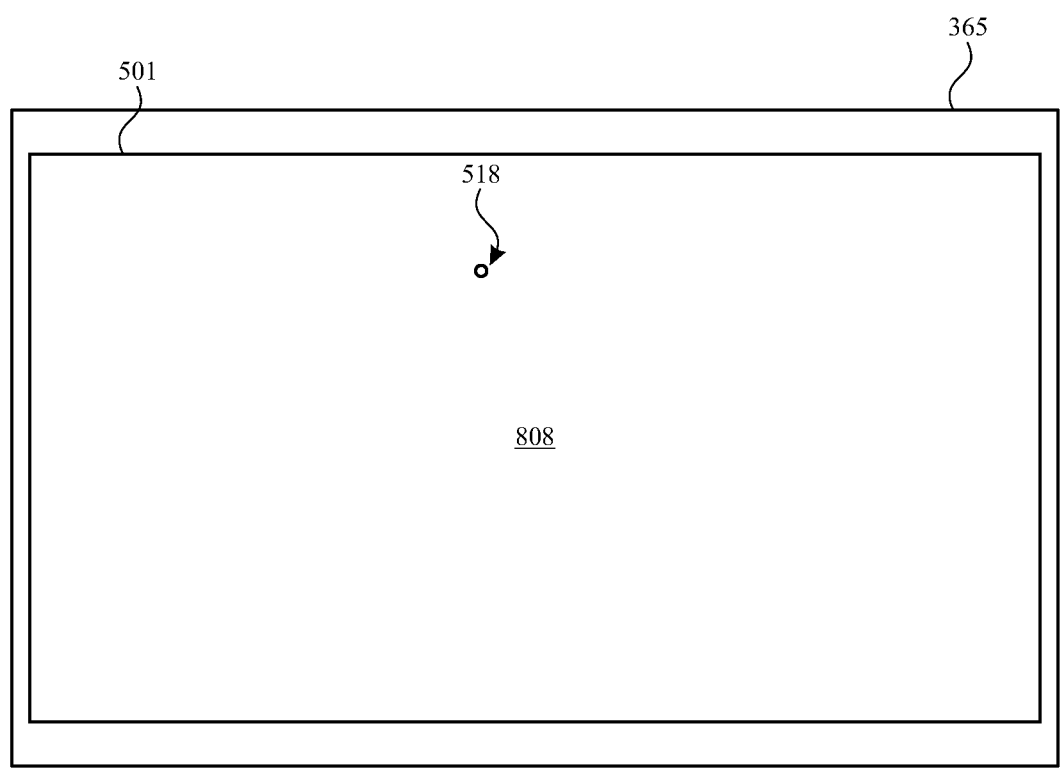

FIGS. 7 and 8 illustrate examples of how the system of FIG. 6 can avoid and/or correct for the cross-platform artifacts shown in FIGS. 4 and 5, respectively. For example, as shown in FIG. 7, responsive to the user of the electronic device 105 requesting to cast the UI 402, as displayed on the display 225, to the display 365 of the other electronic device 305, the electronic device 105 may generate a second rendering of the UI 402 that is different from the rendering that is displayed on the display 225. As shown, the second rendering of the UI 402 that is displayed on the display 365 of the other electronic device 305 may have a viewing angle that is different from the viewing angle of the UI 402 as presented by the display 225. In the example of FIG. 7, the UI 402 in the second rendering that is displayed by the display 365 is presented in a face-on viewing angle that extends along the same dimensions as the physical dimensions of the display 365. As shown in FIG. 7, the second rendering of the UI 402 that is displayed by the display 365 has a different tone mapping than the tone mapping of the UI 402 in the first rendering that is displayed by the display 225, such that the background and the UI elements 404 are more readily viewable on the display 365.

In the example of FIG. 8, responsive to the user of the electronic device 105 requesting to share the XR scene 501 being viewed by the user of the electronic device 105 on the display 225, to the display 365 of the other electronic device 305, the electronic device 105 may generate a second rendering of the XR scene 501 that is an non-foveated rendering. For example, the non-foveated rendering of the XR scene 501 that is displayed by the display 365 may have a single content resolution 808 that is the same throughout the XR scene 501. In this way, a second rendering can be provided for display by the display 365 that is in focus and/or clear, irrespective of the gaze location 518 on the display 365.

Figure 9:
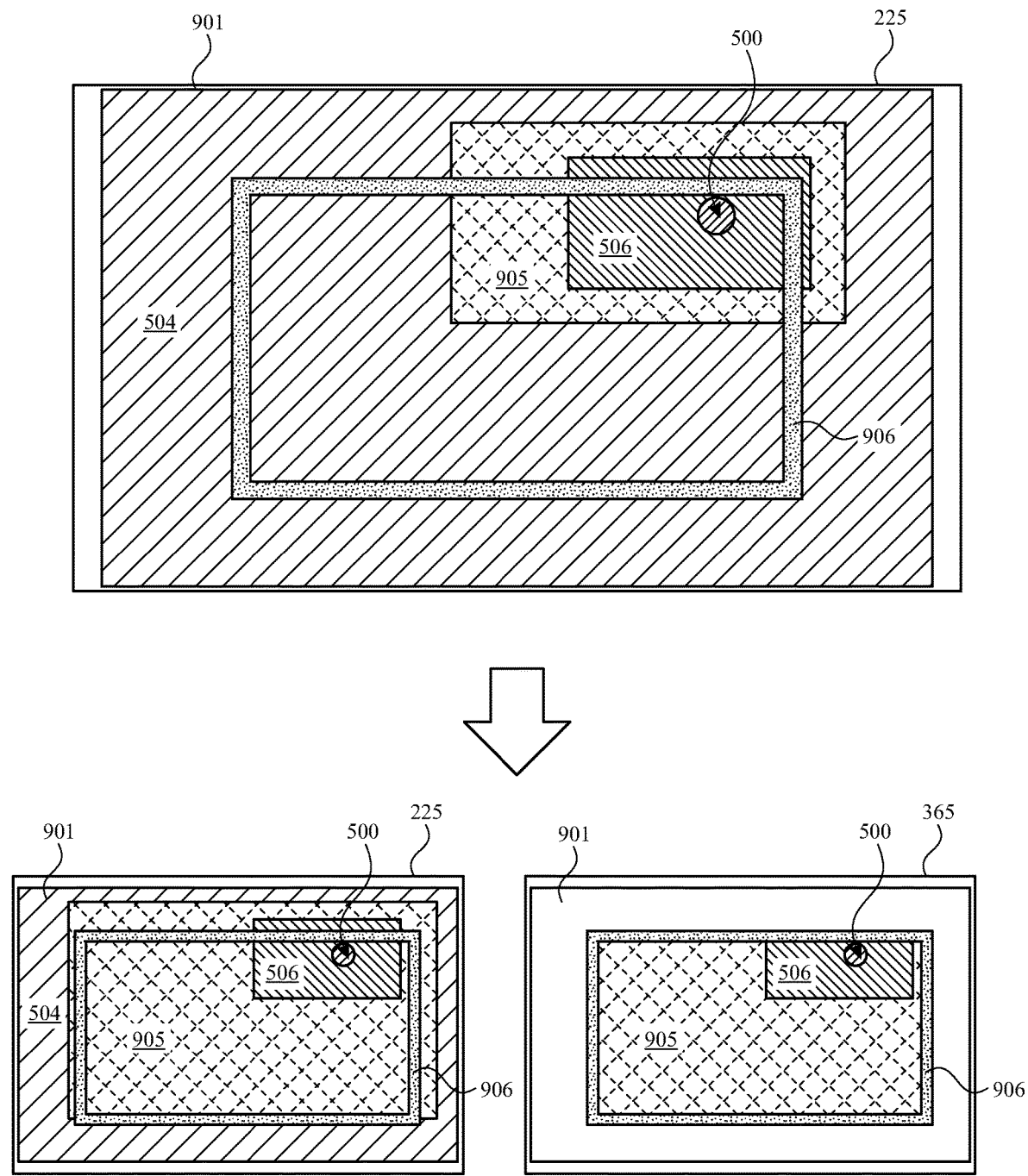
FIG. 9 illustrates an example of a foveated rendering of display content that is displayed by a first device and a second, differently foveated, rendering of the display content being displayed by a display of another device in accordance with aspects of the subject technology.

In the example of FIG. 8, the second rendering of the XR scene 501 is a non-foveated rendering. In other examples, rather than generating a second rendering of the XR scene 501 for display by the display 365 of the other electronic device 305, the electronic device 105 may modify the foveation of the XR scene 501 being displayed by the electronic device 105 in a way that is acceptable for display at the other electronic device 305. For example, FIG. 9 illustrates a use case in which a foveated rendering of an XR scene 901 is displayed on the display 225. In the foveated rendering of the XR scene 901 on the display 225, a portion 506 of the XR scene 501 has a content resolution that is higher than the content resolution in an intermediate-resolution portion 905, and the content resolution in the intermediate-resolution portion 905 is higher than the content resolution in the portion 504. In this example, the portion 506 of the XR scene 901 is centered on a gaze location 500. Because the user of the electronic device 105 is gazing at the gaze location 500, the reduced resolution of the intermediate-resolution portion 905 and the portion 504 of the XR scene 901 may not be noticeable to the user.

In this example, the user of the electronic device 105 may request to share a portion 906 (e.g., the entire viewable area of the display or a portion thereof) of the XR scene 901 being viewed by the user of the electronic device 105 on the display 225, to the display 365 of the other electronic device 305. In the example of FIG. 9, the electronic device 105 modifies the foveation of the XR scene 901 that is being viewed by the user of the electronic device 105 to a (e.g., less aggressive) foveation that is different from the foveation of the rendering that is displayed at the display 225 prior to the request. In this example, the size of the intermediate-resolution portion 905 of the foveated rendering during screen recording or screen sharing is expanded relative to the size of the intermediate-resolution portion 905 of the foveated rendering used when no screen recording or screen sharing is being performed. In this example, the size of the intermediate-resolution portion 905 of the foveated rendering is expanded to substantially fill the portion 906 that is being shared to the display 365. In one or more implementations, the intermediate-resolution portion 905 may be expanded to fill the entire display 225. In this example, the rendering that is displayed by the display 365 does not include any portion having the content resolution of the portion 504 of the first rendering. In the examples of FIGS. 8 and 9, the non-foveated second rendering and/or the differently foveated rendering can be generated by generating the foveated first rendering and de-foveating and/or modifying the foveation of the foveated first rendering, or may be generated by generating the non-foveated second rendering and/or the differently foveated second rendering in a parallel with generating the foveated first rendering.

The examples of FIGS. 7-9 illustrate some of the cross-platform artifacts that can be avoided, mitigated, or removed by generating a second rendering as in the example of FIG. 6. Other examples of cross-platform artifacts that can be avoided, mitigated, or removed by generating a second rendering as in the example of FIG. 6 include artifacts associated with image warping that is performed on images of a physical environment to reproject the images from the camera-view perspective to a perspective of the user's eyes, depth mitigation and/or occlusion by other virtual objects and/or physical objects, spherical aberration correction artifacts and/or other lens-related correction artifacts associated with lenses through which the user of the electronic device 105 views the display 225, background content artifacts, and/or vignetting artifacts.

Figure 10:
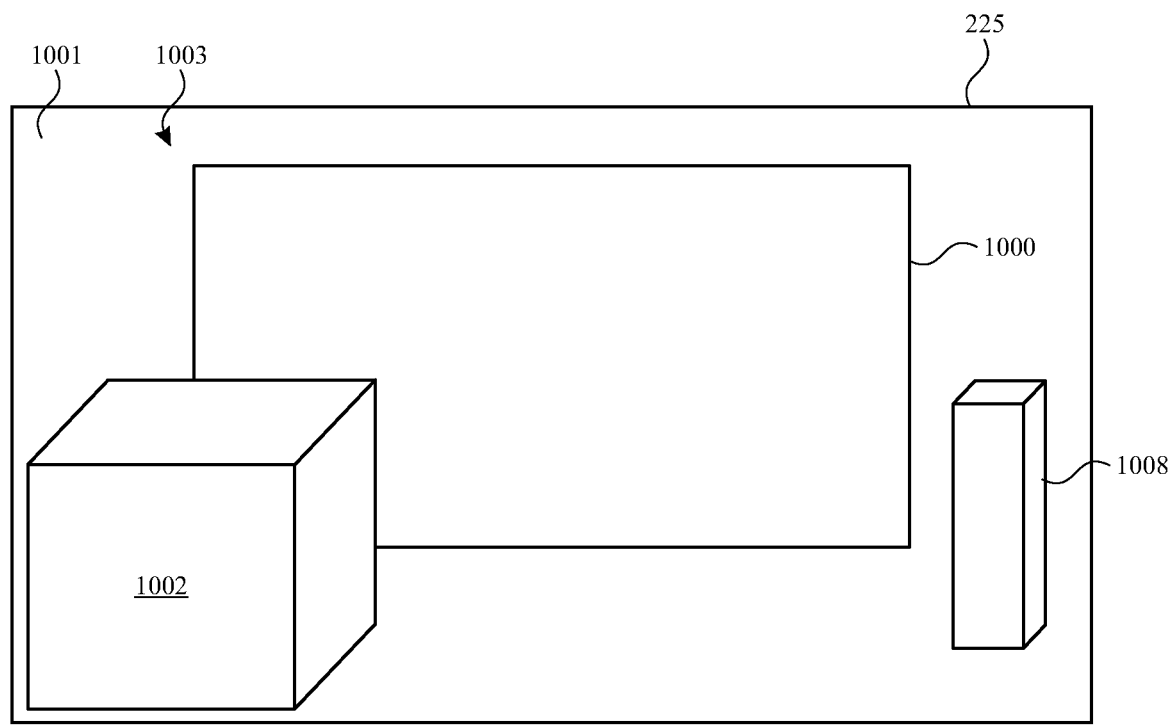
FIG. 10 illustrates an example of an occluded first rendering of display content that is displayed by a first device and a second, non-occluded, rendering of the display content being displayed by a display of another device in accordance with aspects of the subject technology.
Figure 10:
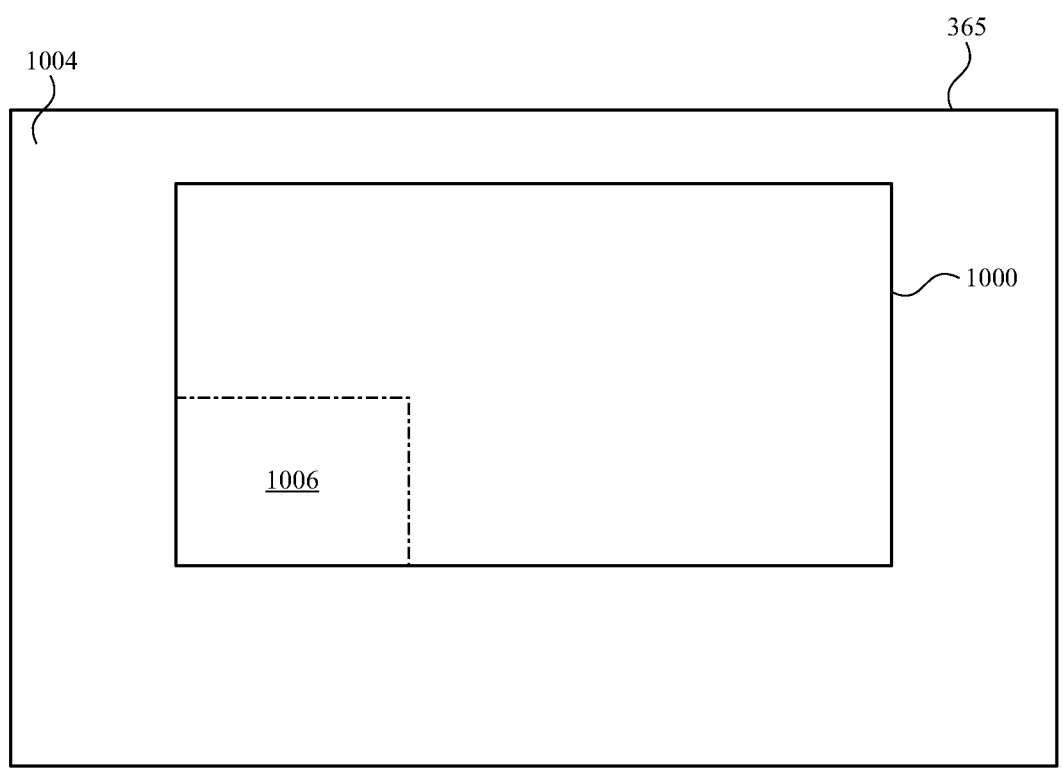

As one additional example, FIG. 10 illustrates a use case in which a second rendering accounts for an occlusion in the first rendering. In the example of FIG. 10, display content 1000 (e.g., a UI of an application, or other virtual display content) is displayed by the display 225 to appear at a location, remote from the display 225 in a physical environment 1001 that is visible via the display 225 (e.g., via images of the physical environment 1001 displayed on the display 225 with the display content 1000, and/or through a transparent or translucent portion of the display 225). In this example, a foreground object 1002 (e.g., a physical object in the physical environment 1001, or another virtual object displayed by the display) is positioned partially in front of the display content 1000 from the perspective of the viewer of the display 225 and occludes a portion of the display content 1000. In this example, the occluded portion of the display content 1000 missing from (e.g., is not included in) the first rendering that is displayed on the display 225. However, if this same first rendering were to be displayed on another device in which the foreground object 1002 is not visible, the missing portion of the display content 1000 may appear as an occlusion artifact on the other device. Accordingly, as shown in FIG. 10, if a request to share the display content 1000 to another electronic device, such as the other electronic device 305, is received by the electronic device 105, the electronic device 105 may generate a second rendering of the display content 1000 that includes the missing portion 1006 of the display content 1000 that is not displayed at the display 225. In this way a cross-platform occlusion artifact can be avoided.

FIG. 10 also illustrates how some objects that are visible in an XR scene 1003 at the electronic device 105 may be omitted from a shared version 1004 of the XR scene 1003. For example, in FIG. 10, an object 1008 (e.g., a physical object in the physical environment 1001, or another virtual object displayed by the display) that is visible in the XR scene 1003 may be omitted from the second rendering that is displayed at the display 365 of the other electronic device 305. For example, the object 1008 may be a physical object in the physical environment that includes one or more attributes that could reveal the location of the user of the electronic device 105, or user-specific information in the user's physical environment.

For example, in one or more implementations, the display 225 may be a pass-through display that displays the display content 1000 combined with images of the physical environment 1001 of the electronic device 105. In this example, the second rendering of the XR scene 1003 that is provided for display at the display 365 of the other electronic device 305 may omit the images of the physical environment 1001 (e.g., and in this way, omit the view of the object 1008). In this way, the privacy of the user of the electronic device 105 can be protected by preventing transmission of user-specific information in the physical environment 1001 to another electronic device. In another example, rather than omitting the images of the physical environment 1001, the second rendering of the XR scene 1003 that is provided for display at the display 365 of the other electronic device 305 may include blurred or otherwise obscured versions of the images of the physical environment 1001 (e.g., blurring or obscuring the view of the object 1008, such that user-specific information that may be conveyed by the view of the object 1008 is prevented from viewing at the other electronic device).

In yet another example, the object 1008 may be a virtual display object, such as a notification, a password, an account identifier, or an open document or UI that is separate from the display content 1000. In this other example, the virtual display object may be omitted from the second rendering of the XR scene 1003 that is provided for display at the display 365 of the other electronic device 305 to avoid transmitting user-specific electronic information to another electronic device.

Figure 11:
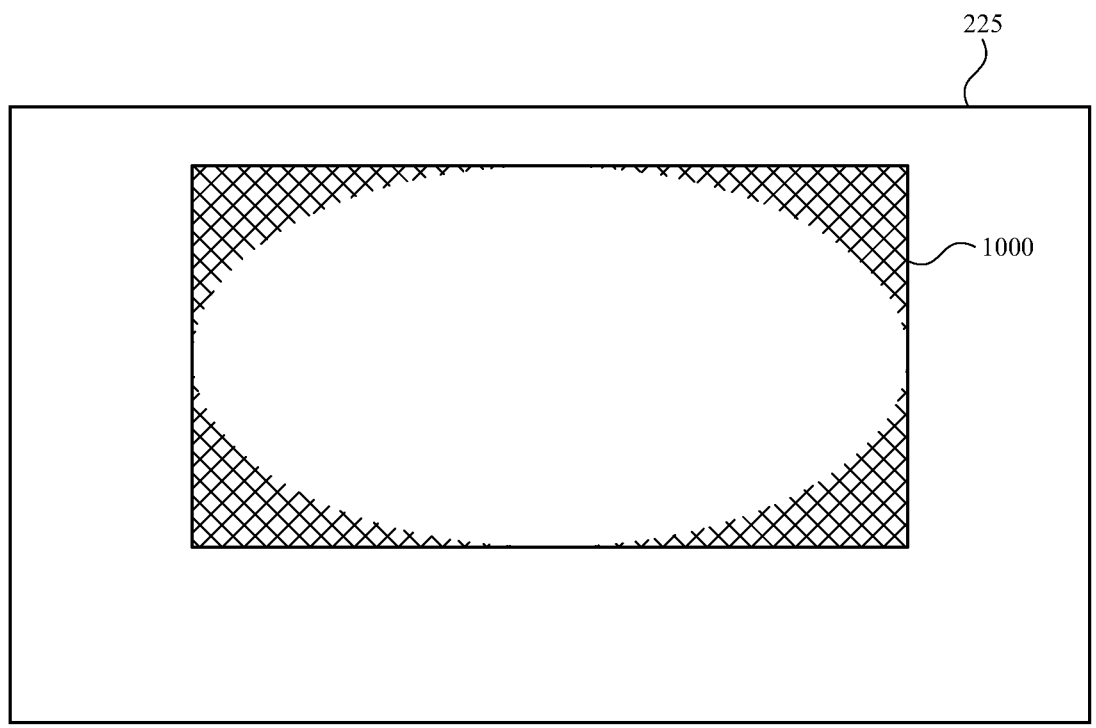
FIG. 11 illustrates an example of a vignetted first rendering of display content that is displayed by a first device and a second, non-vignetted, rendering of the display content being displayed by a display of another device in accordance with aspects of the subject technology.
Figure 11:
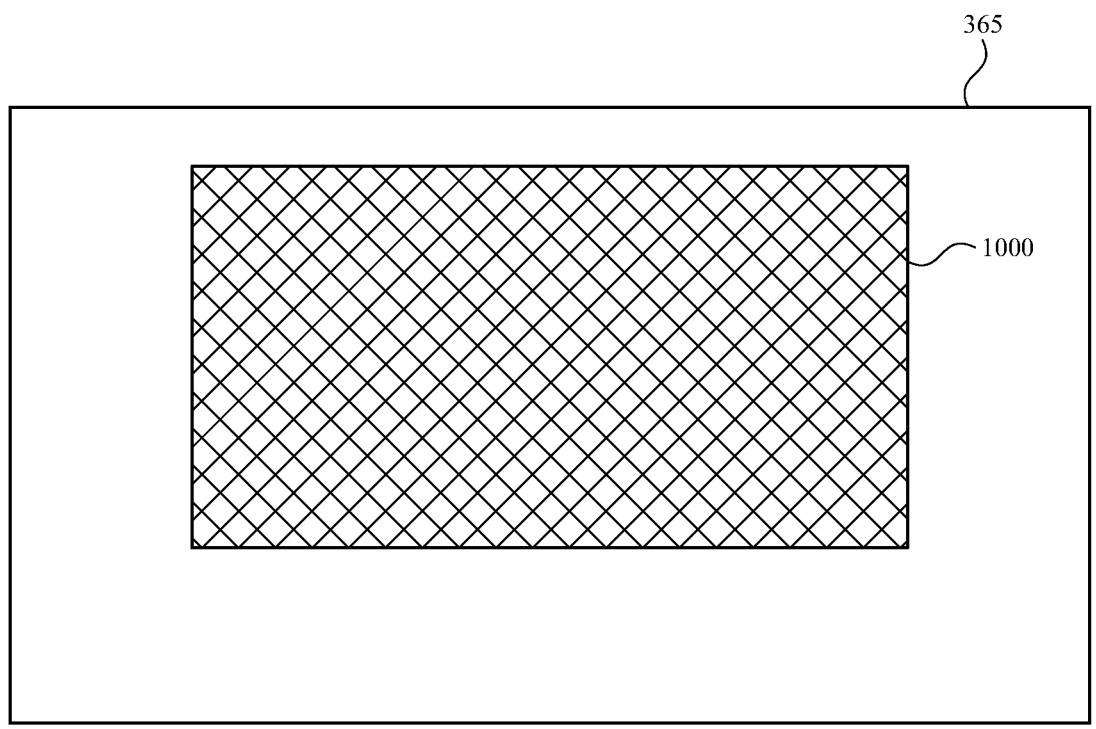

FIG. 11 illustrates another example use case in which a second rendering of display content that is displayed at a first electronic device accounts for a vignetting in the first rendering. In the example of FIG. 11, display content 1100 (e.g., a UI of an application, or other virtual display content) is displayed by the display 225 with a vignetting effect in which the edge regions of the display content 1100 are reduced in brightness or saturation relative to center regions of the display content 1100. For example, the vignetting effect on the display 225 in FIG. 11 may be used when the display content 1100 is displayed, by the display 225, to appear at a location, away from the display 225, and perceptually near to the eyes of the user. For example, the display content 1100 may be displayed near enough to the user that the user can turn their head (e.g., rather than just moving their eyes) to view the edge regions of the display content 1100. However, when displayed on a display of another electronic device, such as the display 365 of the electronic device 305, the entire vignetted rendering of the display content 1100 may be visible in the center of the field of view of the user of the electronic device 305. In this case, the vignetting effect that is beneficial on the display 225 may be perceived as an artifact on the display 365. In this example, if a request to share the display content 1100 to another electronic device, such as the other electronic device 305 is received by the electronic device 105, the electronic device 105 may generate a second rendering of the display content 1100, for display on the display 365, that is free of the vignetting effect.

Various examples of differences between a first rendering of display content for display at a first device and a second rendering of the same display content are described individually in connection each of with FIGS. 7-11 for simplicity of the discussion. However, it is appreciated that the second rendering of the display content may include two or more or all of the differences described herein in connection with FIGS. 7-11 and/or other differences (e.g., de-warping, spherical aberration, etc.) as described herein.

Figure 12:
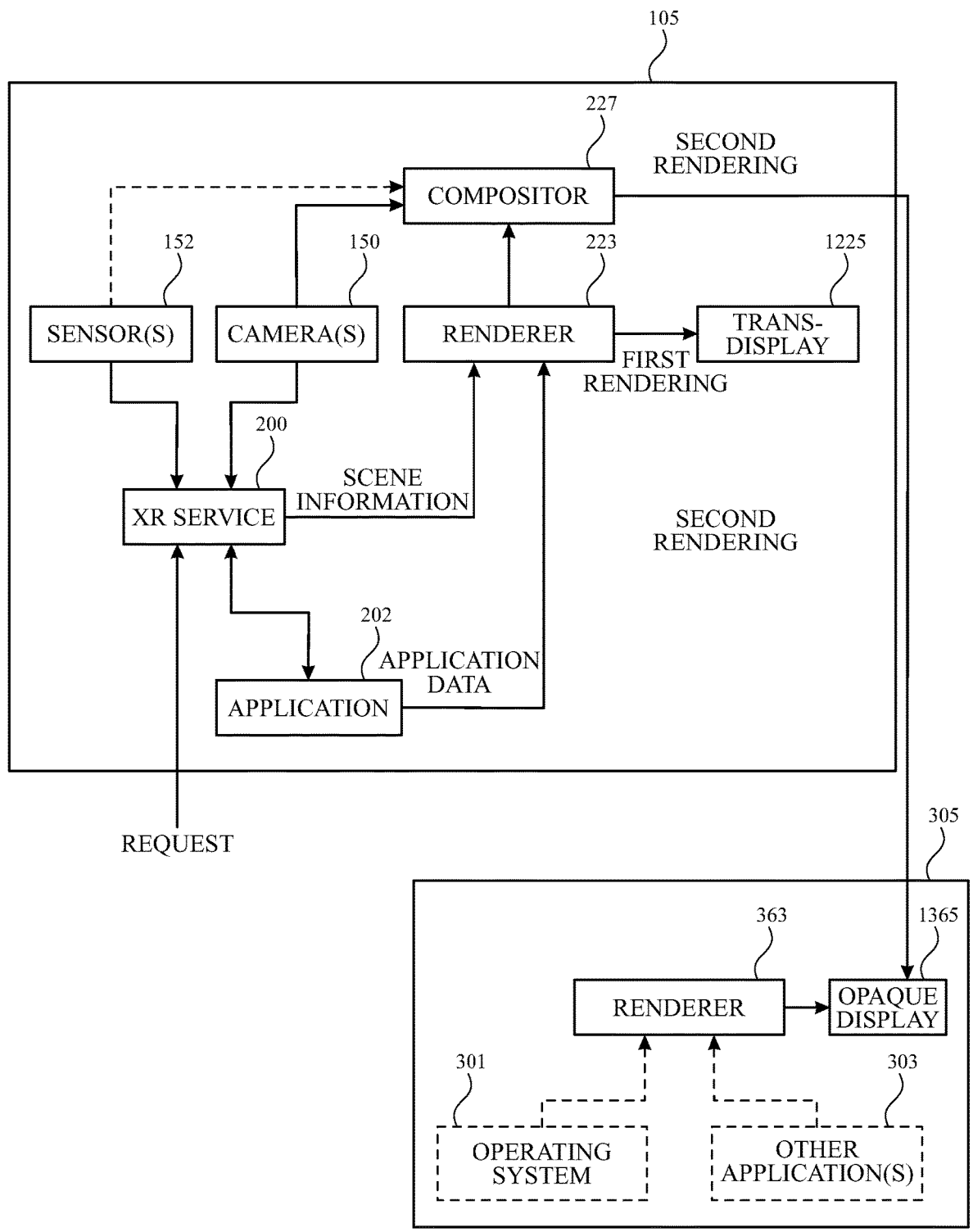
FIG. 12 illustrates an example of a first electronic device generating a first rendering of display content for display by a transparent or translucent display at the first electronic device and a second rendering of the display content for display by an opaque display at a second electronic device in accordance with aspects of the subject technology.

As discussed herein, in one or more implementations, the display of the electronic device 105 may be implemented as a transparent or a translucent display. FIG. 12 illustrates an example use case in which the electronic device 105 includes a transparent or translucent display 1225, and shares display content with another electronic device 305 having an opaque display 1365. As shown in the example of FIG. 12, the first rendering that is generated by the renderer 223 and provided for display by the transparent or translucent display 1225 may be generated without including images of the physical environment of the electronic device 105 from the camera(s) 150. In this example, because the transparent or translucent display 1225 is transparent or translucent, the user of the electronic device 105 may be able to view one or more portions of the physical environment of the electronic device 105 directly through the transparent or translucent display 1225. In this way, the electronic device 105 can provide an augmented reality environment for the user of the electronic device 105 by displaying display content, such as scene information from the XR service 200 and/or application data from the application 202, overlaid on a portion of the display 225 through which a direct view of the physical environment of the electronic device 105 can be seen.

In this example, the electronic device 105 may receive a request to capture and/or share some or all of the augmented reality environment that is visible to the user of the electronic device 105 via the transparent or translucent display 1225. However, if the same first rendering that is displayed by the transparent or translucent display 1225 were to be captured and/or shared, only the virtual content of the augmented reality environment would be included for display, and potentially relevant portions of the physical environment of the electronic device 105 would be omitted from the captured and or shared rendering.

As shown in FIG. 12, responsive to a request to share some or all of the augmented reality environment being viewed by the user of the electronic device 105 via the transparent or translucent display 1225, in one or more implementations, the electronic device 105 may generate a second rendering that is different from the first rendering. In this example, the electronic device 105 may capture, using one or more cameras 150, one or more images of the physical environment of the electronic device 105. The electronic device 105 may provide the captured images of the physical environment to the compositor 227. The compositor 227 may also receive the first rendering from the renderer 223 (and/or may receive the scene information from the XR service 200 and/or the application data from the application 202), and may composite the captured images of the physical environment with the virtual content included in the first rendering to generate the second rendering. For example, the renderer 223 (and/or a second renderer, as discussed in further detail hereinafter in connection with FIG. 13) may render an image including the virtual content from a point of view that matches the point of view of the camera(s). The compositor 227 may then combine the image(s) from the camera(s) and the rendered image including the virtual content, to create the second rendering for recording and/or sharing. In this way, the second rendering can include the virtual content that is displayed by the transparent or translucent display 1225 overlaid on an image-based view of the physical environment of the electronic device 105. In this way, an electronic device that provides an augmented reality environment without using images of the physical environment (e.g., using a direct view through a transparent or translucent display) can also capture and/or share a second rendering of the augmented reality environment using images of the physical environment (e.g., for display by an opaque display). As shown in FIG. 12, the second rendering may be provided to the other electronic device 305 for display on an opaque display 1365. The second rendering may also, or alternatively, be stored at the electronic device 105 (e.g., in memory of the electronic device 105).

Figure 13:
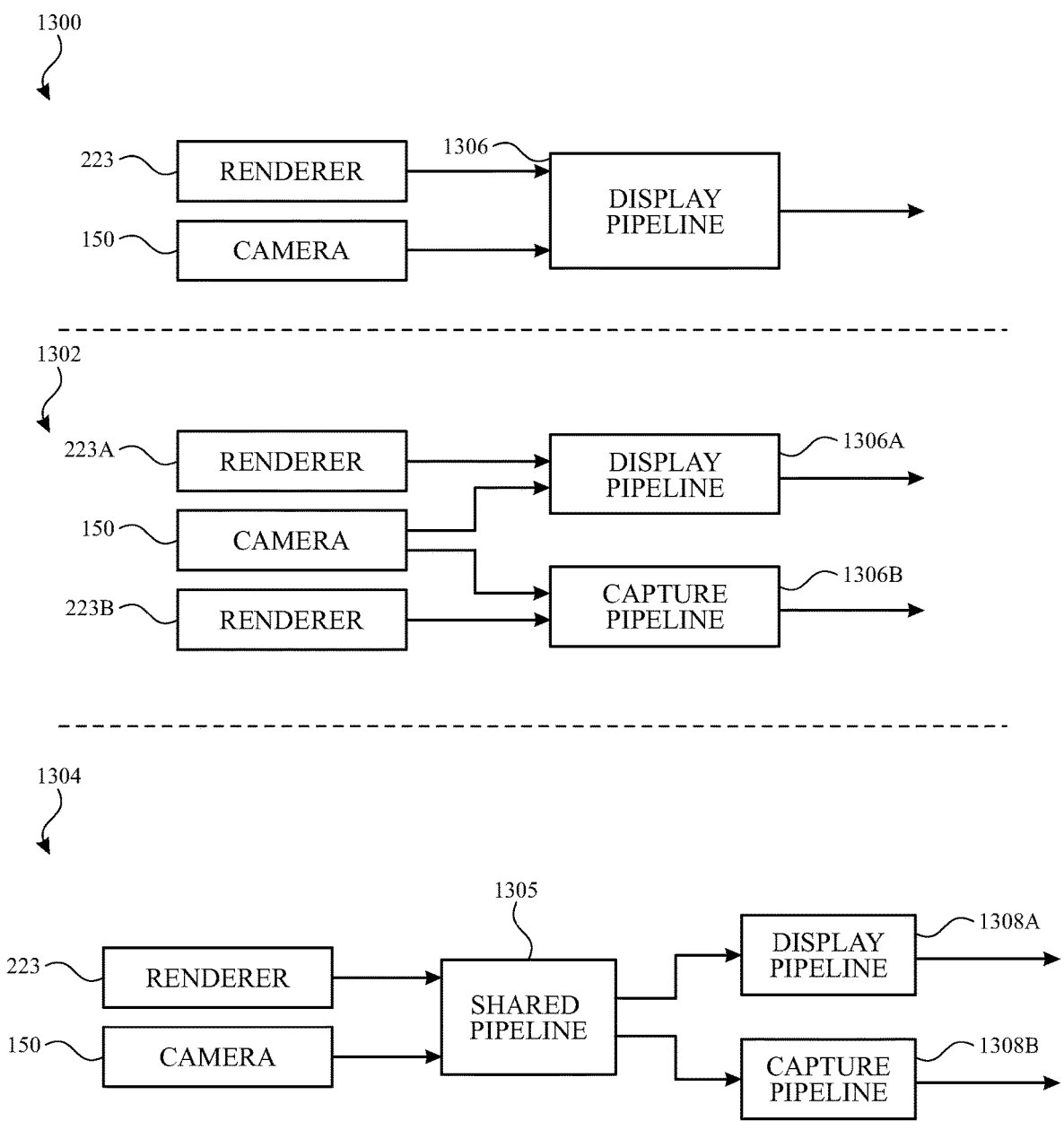
FIG. 13 illustrates a schematic diagram of various exemplary implementations of a display architecture for generating first and second renderings of display content in accordance with aspects of the subject technology.

FIG. 13 illustrates a schematic diagram of various exemplary implementations of a display architecture for generating first and/or second renderings of display content in accordance with aspects of the subject technology. As shown in FIG. 13, a display architecture 1300 that may be implemented at the electronic device 105 may include the renderer 223 and the camera(s) 150 of FIG. 1 that provide, respectively, a rendering of an XR scene and one or more images of a physical environment of an electronic device to a display pipeline 1306 (e.g., compositor 227) that provides a composite rendering for display. In the display architecture 1300, the rendering operation performed by the display architecture 1300 may be executed, and the output of the display pipeline 1306 can be provided for both the display 225 and the display 365).

In other implementations, a display architecture 1302 that may be implemented at the electronic device 105 may include a first renderer 223A, a second renderer 223B, and the camera(s) 150. In this example, the first renderer 223A may provide a first rendering of display content to a display pipeline 1306A (e.g., a first compositor 227 and/or other processing operations such as warping and/or foveation operations), the second renderer may provide a second rendering of the display content to a capture pipeline 1306B (e.g., a second compositor 227), and the camera(s) 150 may provide the images of the physical environment of the electronic device 105 to both the display pipeline 1306A and the capture pipeline 1306B. In the example display architecture 1302, the display pipeline 1306A may output a first rendering for display by the display 225 and the capture pipeline 1306B may output a second rendering for display by the display 365 of the other electronic device 305 (e.g., and/or for storage at the electronic device 105).

In other implementations, a display architecture 1304 that may be implemented at the electronic device 105 may include the renderer 223, the camera(s) 150, a shared pipeline 1305, a display pipeline 1308A and a capture pipeline 1308B. In this example, the renderer 223 may provide an initial rendering of display content to the shared pipeline 1305, and the camera(s) 150 may provide one or more images of the physical environment of the electronic device 105 to the shared pipeline 1305. The shared pipeline 1305 may perform display content processing operations that would otherwise be performed by both the display pipeline 1306A and the capture pipeline 1306B of display architecture 1302 to improve processing efficiency. In this example of the display architecture 1304, the shared pipeline 1305 may provide intermediate rendering information (e.g., an intermediate rendering) to both the display pipeline 1308A and the capture pipeline 1308B. The display pipeline 1308A and the capture pipeline 1308B may then perform processing operations that are specific to generating the first rendering and the second rendering. For example, the shared pipeline 1305 may generate more detailed image renderings that can be used by both the display pipeline 1308A and the capture pipeline 1308B. The display pipeline 1308A and the capture pipeline 1308B may post-processes the intermediate rendering information for optimal respective in-headset and shared viewing experiences, in one or more implementations.

In one or more implementations, tone mapping and color management may be different in the display pipeline 1308A than in the capture pipeline 1308B and/or in the display pipeline 1306A than in the capture pipeline 1306B. In one or more implementations, the capture pipeline 1306B and/or the capture pipeline 1308B may omit chromatic aberration corrections, warping operations, vignetting operations, foveation operations, and/or other operations that are performed by the display pipeline 1306A and the display pipeline 1308A. In one or more implementations, the capture pipeline 1306B and/or the capture pipeline 1308B may omit or obscure display content including a user's private data, such as passwords, notifications, locations, and/or other user-specific data that may be included, for viewing by the user of the electronic device, by the display pipeline 1306A and the display pipeline 1308A. In one or more implementations, the capture pipeline 1306B and/or the capture pipeline 1308B may perform different tone mapping, brightness control, color space, and/or foveation operations than the tone mapping, brightness control, color space, and/or foveation operations that are performed by the display pipeline 1306A and/or the display pipeline 1308A.

Figure 14:
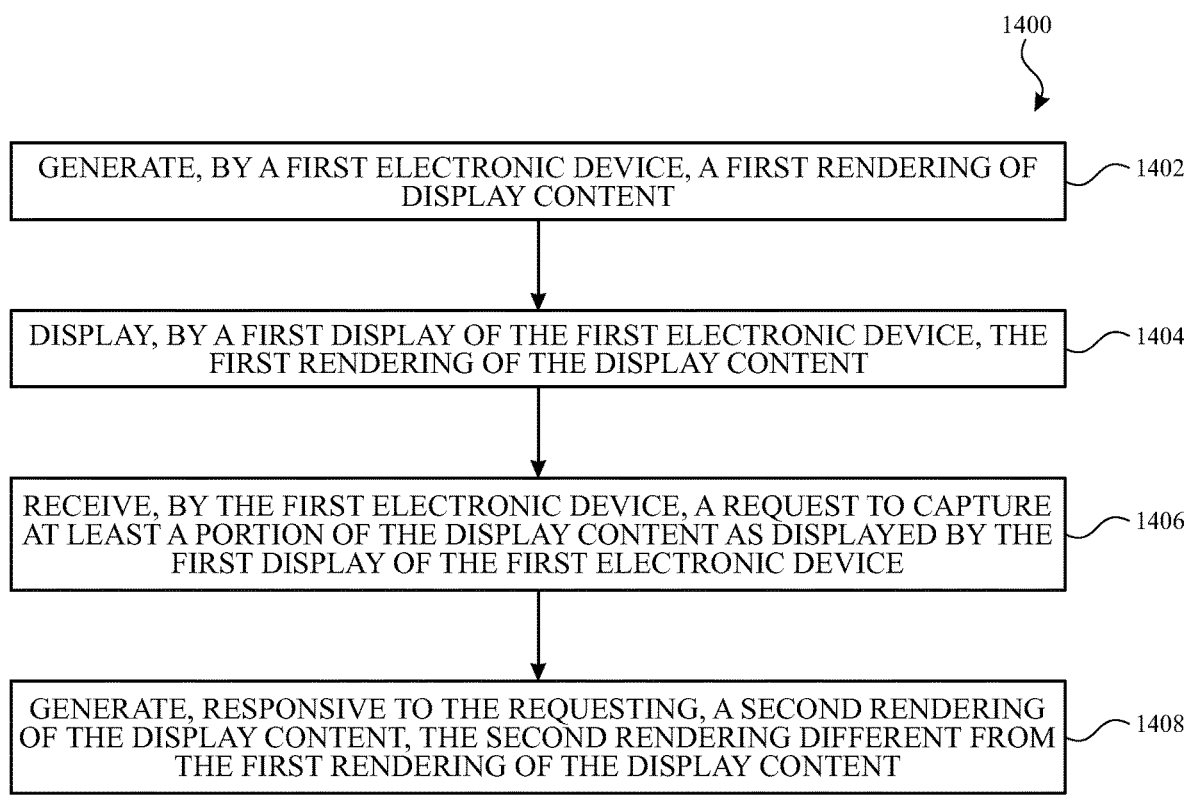
FIG. 14 illustrates a flow diagram of an example process for cross-platform sharing of display content to in accordance with aspects of the subject technology.

FIG. 14 illustrates a flow diagram of an example process for receiving a casted application according to aspects of the subject technology. The blocks of process 1400 are described herein as occurring in serial, or linearly. However, multiple blocks of process 1400 may occur in parallel. In addition, the blocks of process 1400 need not be performed in the order shown and/or one or more blocks of process 1400 need not be performed and/or can be replaced by other operations.

In the example of FIG. 14, at block 1402, a first electronic device (e.g., the electronic device 105) may generate a first rendering of display content. For example, generating the first rendering may include obtaining scene information from a system process (e.g., XR service 200) of the first electronic device and/or application data from one or more applications (e.g., application 202) running at the first electronic device, and rendering one or more display frames for display by a display (e.g., display 225) of the electronic device, the display frames including the scene information and/or the application data. As examples, the first rendering may include a rendering of a virtual scene including virtual content (e.g., corresponding to the scene information and/or the application data) distributed for three-dimensional viewing, a rendering of a mixed reality scene including mixed reality content including one or more images of a physical environment (e.g., scene information) and virtual content (e.g., corresponding to system content and/or application data) overlaid and/or otherwise combined with the images of the physical environment to appear at locations within the physical environment, and/or a rendering of virtual portions of an augmented reality scene in which the virtual portions (e.g., corresponding to system content and/or application data) are configured (e.g., based on the scene information, such as a depth map) to be displayed over a direct view (e.g., through a display of the first electronic device) of the physical environment to appear at locations within the physical environment.

At block 1404, a first display (e.g., display 225) of the first electronic device may display the first rendering of the display content. For example, the first rendering may include a three-dimensional rendering that, when displayed by the first display of the first electronic device, includes at least some display content that is perceivable by a viewer of the first display of the first electronic device at a location remote from the first display of the first electronic device. For example, the first display may be a stereoscopic display and displaying the first rendering may include displaying a left-eye portion of the first rendering on a left-eye portion of the first display and displaying a right-eye portion of the first rendering on a right-eye portion of the first display.

At block 1406, the first electronic device may receive a request to capture at least a portion of the display content displayed by the first display of the first electronic device. For example, the request may be a user request. For example, the user request may be received in the form of a gesture, a gaze, a spoken command, and/or an interaction with a physical user input component (e.g., a button, a touch-based sensor, or the like). In one or more implementations, the user request may include a selection of a portion of the displayed content to be captured. For example, the user may indicate the selected portion by gesturing to one or more locations, away from the first display of the first electronic device, at which the displayed content appears (e.g., to the user) to be displayed. In one or more implementations, the request to capture at least the portion of the display content displayed by the first display may be a screen-capture request to capture and store a portion of the displayed content, as viewed by the user, at a particular time. In one or more implementations, the request to capture at least the portion of the display content displayed by the first display may be a screen-recording request to capture and store a portion of the displayed content, as viewed by the user, over a period of time. In one or more implementations, the request to capture at least the portion of the display content displayed by the first display may be a screen-sharing request to capture and share (e.g., transmit or otherwise provide) a portion of the displayed content, as viewed by the user, to another device for display at that other device. In one or more implementations, the request to capture at least the portion of the display content displayed by the first display may be an application-casting request to share (e.g., transmit or otherwise provide) a copy of a UI of an application to another device (e.g., another device at which the application is not installed) for display at that other device.

At block 1408, the first electronic device may generate, responsive to the request, a second rendering of the display content, the second rendering different from the first rendering of the display content. For example, the second rendering may include a two-dimensional rendering. In one or more implementations, the process 1400 may also include providing the second rendering to another electronic device (e.g., the other electronic device 305) for two-dimensional viewing on a display (e.g., display 365 or opaque display 1365) of the other electronic device (e.g., as shown in FIGS. 6 and/or 12).

In one or more implementations, the first rendering may include a portion of the display content displayed at a first viewing angle, and the second rendering may include the portion of the display content displayed at a second viewing angle different from the first viewing angle. For example, the first viewing angle may include a perspective viewing angle, and the second viewing angle comprises a face-on viewing angle (e.g., as in the example of FIG. 7).

In one or more implementations, the first rendering may include a foveated rendering and the second rendering may include a non-foveated rendering (e.g., as in the example of FIG. 8). In one or more implementations, the first rendering may include a foveated rendering generated using a first foveation pattern, and the second rendering may include different foveated rendering generated using a different foveation pattern. In one or more implementations, responsive to the request, the electronic device may modify the first rendering to include the different foveation pattern, and then provide the modified foveated rendering using the different foveation pattern for recording and/or display at both the first electronic device and the second electronic device (e.g., as in the example of FIG. 9).

In one or more implementations, the first rendering may include a first tone mapping configured for viewing in a first environment, and the second rendering comprises a second tone mapping configured for viewing in a second environment brighter than the first viewing environment (e.g., as in the example of FIG. 7). For example, the first environment may be an enclosed space around the eyes of a user of the first electronic device in an implementation in which the first electronic device is a head mountable device that mounts the first display near (e.g., within inches or less) the eyes of the user and/or blocks ambient light from reaching the eyes of the user. As an example, the second environment may be an indoor or outdoor environment in the second rendering is displayed by a display of a handheld, portable, desktop, laptop, or wall-mounted device (as examples) and/or in which display light corresponding to the second rendering is configured to be received at the user's eye along with ambient light from the indoor or outdoor environment.

In one or more implementations, the first rendering omits a portion of the display content that is occluded by other display content or by an object in a physical environment of the first electronic device, and the second rendering includes the portion (e.g., portion 1006) of the display content that is omitted from the first rendering (e.g., as in the example of FIG. 10).

In one or more implementations, the first rendering includes a portion of the display content that is vignetted based on a perceivable location of the portion of the display content, and the second rendering includes a non-vignetted version of the portion of the display content (e.g., as in the example of FIG. 11).

In one or more implementations, generating the first rendering may include obtaining an image of a physical environment of the first electronic device using a camera (e.g., one or more of camera(s) 150) of the first electronic device, applying a first warping to the image that transforms the image from a camera view perspective to a user view perspective, and combining the warped image with the display content. In these implementations, generating the second rendering may include at least one of: applying a different warping to the image, applying no warping to the image, or using a different image from a different camera to generate the second rendering.

In one or more implementations, the first rendering is generated, in part, by applying a chromatic aberration correction to the display content, and the second rendering is generated without applying the chromatic aberration correction to the display content. In one or more implementations, generating the first rendering may include combining the display content with an image of a physical environment of the first electronic device, and generating the second rendering may include combining the display content with an obscured version of the image. In one or more implementations, generating the first rendering may include combining the display content with an image of a physical environment of the first electronic device, and generating the second rendering may include rendering the display content without combining the display content with the image. In one or more implementations, the first rendering includes user-specific information (e.g., environmental information such as a location, or a view of the user's physical environment, and/or displayed information such as a notification, a password, or other content being displayed to the user) corresponding to a user of the first electronic device, and the second rendering may be generated without including the user-specific information.

In one or more implementations, the first display may be or include a transparent or translucent display (e.g., transparent or translucent display 1225). In these implementations, displaying the first rendering may include overlaying the display content on a direct view of a physical environment of the first electronic device through a corresponding portion of the transparent or translucent display. In these implementations, generating the second rendering may include: capturing an image of the portion of the direct view of the physical environment using a camera (e.g., one or more of camera(s) 150) of the first electronic device, and overlaying the display content on the image (e.g., as described herein in connection with FIG. 12).

In one or more implementations, generating the first rendering may include generating the first rendering by a first renderer (e.g., first renderer 223A) at the first electronic device, and generating the second rendering may include generating the second rendering by a second renderer (e.g., second renderer 223B), separate from the first renderer, at the first electronic device (e.g., as described herein in connection with the display architecture 1302 of FIG. 13). In one or more other implementations, the process 1400 may include generating an intermediate rendering of the display content (e.g., using renderer 223 and/or the shared pipeline 1305 of the display architecture 1304 of FIG. 13) at the first electronic device; generating the first rendering (e.g., using display pipeline 1308A of FIG. 13) by applying a first modification to the intermediate rendering; and generating the second rendering (e.g., using capture pipeline 1308B of FIG. 13) by applying a second modification to the intermediate rendering.

As described above, aspects of the subject technology may include the collection and transfer of data from an application to other users' computing devices. The present disclosure contemplates that in some instances, this collected data may include personal information data that uniquely identifies or can be used to identify a specific person. Such personal information data can include demographic data, location-based data, images, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used in a cross-platform sharing of displayed content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of cross-platform sharing of displayed content, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 15:
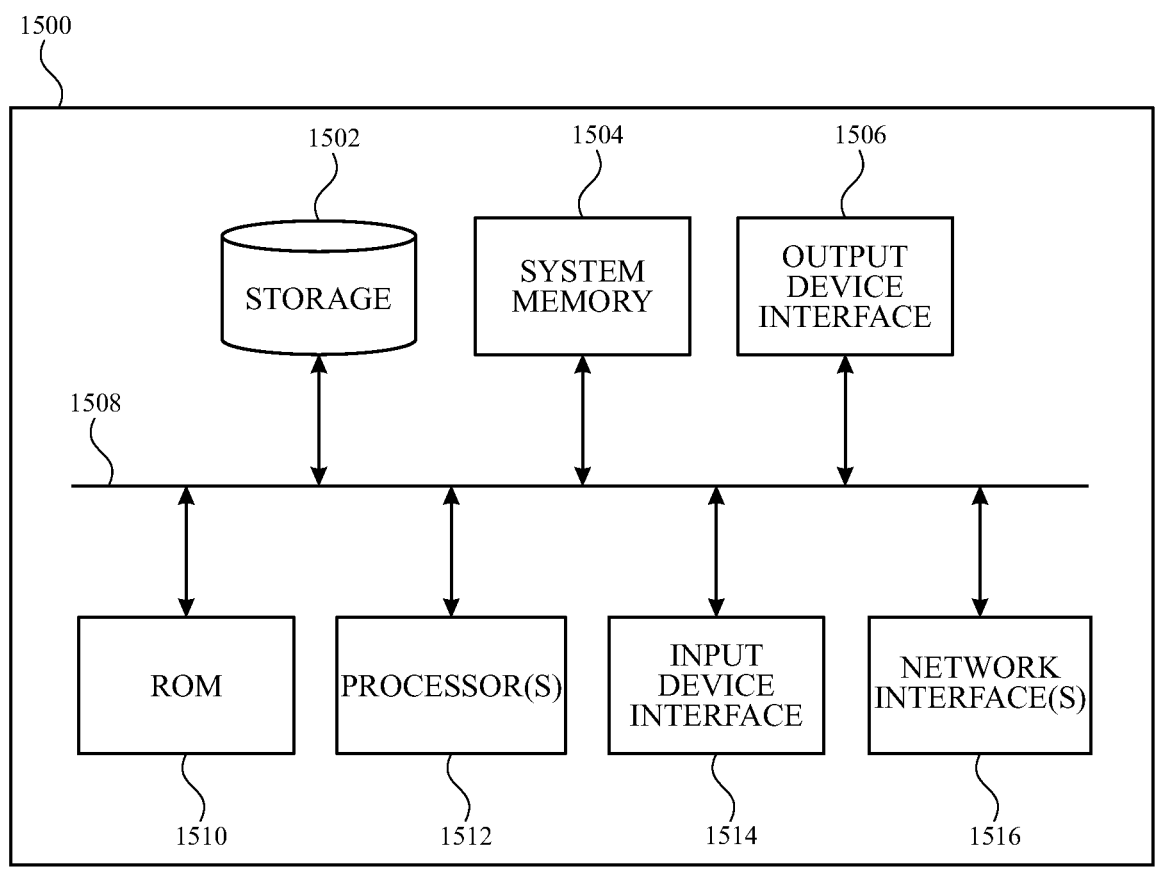
FIG. 15 illustrates an example computing device with which aspects of the subject technology may be implemented.

FIG. 15 illustrates an example computing device with which aspects of the subject technology may be implemented in accordance with one or more implementations. The computing device 1500 can be, and/or can be a part of, any computing device or server for generating the features and processes described above, including but not limited to a laptop computer, a smartphone, a tablet device, a wearable device such as a goggles or glasses, and the like. The computing device 1500 may include various types of computer readable media and interfaces for various other types of computer readable media. The computing device 1500 includes a permanent storage device 1502, a system memory 1504 (and/or buffer), an input device interface 1506, an output device interface 1508, a bus 1510, a ROM 1512, one or more processing unit(s) 1514, one or more network interface(s) 1516, and/or subsets and variations thereof.

The bus 1510 collectively represents all system, peripheral, and chipset buses that communicatively connect the numerous internal devices of the computing device 1500. In one or more implementations, the bus 1510 communicatively connects the one or more processing unit(s) 1514 with the ROM 1512, the system memory 1504, and the permanent storage device 1502. From these various memory units, the one or more processing unit(s) 1514 retrieves instructions to execute and data to process in order to execute the processes of the subject disclosure. The one or more processing unit(s) 1514 can be a single processor or a multi-core processor in different implementations.

The ROM 1512 stores static data and instructions that are needed by the one or more processing unit(s) 1514 and other modules of the computing device 1500. The permanent storage device 1502, on the other hand, may be a read-and-write memory device. The permanent storage device 1502 may be a non-volatile memory unit that stores instructions and data even when the computing device 1500 is off. In one or more implementations, a mass-storage device (such as a magnetic or optical disk and its corresponding disk drive) may be used as the permanent storage device 1502.

In one or more implementations, a removable storage device (such as a floppy disk, flash drive, and its corresponding disk drive) may be used as the permanent storage device 1502. Like the permanent storage device 1502, the system memory 1504 may be a read-and-write memory device. However, unlike the permanent storage device 1502, the system memory 1504 may be a volatile read-and-write memory, such as random access memory. The system memory 1504 may store any of the instructions and data that one or more processing unit(s) 1514 may need at runtime. In one or more implementations, the processes of the subject disclosure are stored in the system memory 1504, the permanent storage device 1502, and/or the ROM 1512. From these various memory units, the one or more processing unit(s) 1514 retrieves instructions to execute and data to process in order to execute the processes of one or more implementations.

The bus 1510 also connects to the input and output device interfaces 1506 and 1508. The input device interface 1506 enables a user to communicate information and select commands to the computing device 1500. Input devices that may be used with the input device interface 1506 may include, for example, alphanumeric keyboards and pointing devices (also called "cursor control devices"). The output device interface 1508 may enable, for example, the display of images generated by computing device 1500. Output devices that may be used with the output device interface 1508 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 15, the bus 1510 also couples the computing device 1500 to one or more networks and/or to one or more network nodes through the one or more network interface(s) 1516. In this manner, the computing device 1500 can be a part of a network of computers (such as a LAN, a wide area network ("WAN"), or an Intranet, or a network of networks, such as the Internet. Any or all components of the computing device 1500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   generating, by a first electronic device, a first rendering of display content;
   displaying, by a first display of the first electronic device, the first rendering of the display content, wherein the first rendering comprises a three-dimensional rendering that, when displayed by the first display of the first electronic device, includes at least some display content that is perceivable, at a location remote from the first display of the first electronic device, by a viewer of the first display of the first electronic device;
   receiving, by the first electronic device, a request to capture at least a portion of the first rendering displayed by the first display of the first electronic device, and to send at least the portion of the display content displayed by the first display of the first electronic device to a second electronic device;
   generating, responsive to the request, a second rendering of the display content, the second rendering different from the first rendering of the display content; and
   providing the second rendering to the second electronic device for two-dimensional viewing on a display of the second electronic device.

2. The method of claim 1, wherein the first rendering includes a portion of the display content displayed at a first viewing angle, and wherein the second rendering includes the portion of the display content displayed at a second viewing angle different from the first viewing angle.

3. The method of claim 2, wherein the first viewing angle comprises a perspective viewing angle that appears to extend away from a user into a physical environment at one end, and wherein the second viewing angle comprises a face-on viewing angle that extends along the same dimensions as physical dimensions of a second display of a second device.

4. The method of claim 1, wherein the first rendering comprises a foveated rendering and wherein the second rendering is a non-foveated rendering.

5. The method of claim 1, wherein the first rendering comprises a first tone mapping configured for viewing in a first environment comprising a darkened environment in which a head mountable device blocks ambient light from reaching a user's eyes, and wherein the second rendering comprises a second tone mapping configured for viewing in a second environment brighter than the first environment and in which in which display light corresponding to the second rendering is configured to be received at a user's eye along with ambient light from the second environment.

6. The method of claim 1, wherein the first rendering omits a portion of the display content that is occluded by other display content or by an object in a physical environment of the first electronic device, and wherein the second rendering includes the portion of the display content that is omitted from the first rendering.

7. The method of claim 1, wherein the first rendering comprises a portion of the display content that is vignetted based on a perceivable location of the portion of the display content, and wherein the second rendering comprises a non-vignetted version of the portion of the display content.

8. The method of claim 1, wherein generating the first rendering comprises obtaining an image of a physical environment of the first electronic device using a camera of the first electronic device, applying a first warping to the image that transforms the image from a camera view perspective to a user view perspective, and combining warped image with the display content, and wherein generating the second rendering comprises at least one of: applying a different warping to the image, applying no warping to the image, or using a different image from a different camera to generate the second rendering.

9. The method of claim 1, wherein the first rendering is generated, in part, by applying a chromatic aberration correction to the display content, and wherein the second rendering is generated without applying the chromatic aberration correction to the display content.

10. The method of claim 1, wherein generating the first rendering comprises combining the display content with an image of a physical environment of the first electronic device, and wherein generating the second rendering comprises combining the display content with an obscured version of the image.

11. The method of claim 1, wherein generating the first rendering comprises combining the display content with an image of a physical environment of the first electronic device, and wherein generating the second rendering comprises rendering the display content without combining the display content with the image.

12. The method of claim 1, wherein the first rendering includes user-specific information corresponding to a user of the first electronic device, and wherein the second rendering is generated without including the user-specific information.

13. The method of claim 1, wherein the first display comprises a transparent or translucent display, wherein displaying the first rendering comprises overlaying the display content on a direct view of a physical environment of the first electronic device through a corresponding portion of the transparent or translucent display, and wherein generating the second rendering comprises: capturing an image of the portion of the direct view of the physical environment using a camera of the first electronic device, and overlaying the display content on the image.

14. The method of claim 1, wherein generating the first rendering comprises generating the first rendering by a first renderer at the first electronic device, and wherein generating the second rendering comprises generating the second rendering by a second renderer, separate from the first renderer, at the first electronic device.

15. The method of claim 1, further comprising:
generating an intermediate rendering of the display content at the first electronic device;
generating the first rendering by applying a first modification to the intermediate rendering; and
generating the second rendering by applying a second modification to the intermediate rendering.

16. An electronic device, comprising:
a display;
a memory; and
one or more processors configured to:
generate a first rendering of display content;
display, by the display, the first rendering of the display content, wherein the first rendering comprises a three-dimensional rendering that, when displayed by the display, includes at least some display content that is perceivable, at a location remote from the display, by a viewer of the display;
receive a request to capture at least a portion of the display content displayed by the display and to send at least the portion of the display content displayed by the display to a second electronic device;
generate, responsive to the request, a second rendering of the display content, the second rendering different from the first rendering of the display content; and
provide the second rendering to the second electronic device for two-dimensional viewing on a display of the second electronic device.

17. A non-transitory computer-readable medium storing instructions which, when executed by one or more processors, cause the one or more processors to:
generate, by a first electronic device, a first rendering of display content;
display, by a first display of the first electronic device, the first rendering of the display content, wherein the first rendering comprises a three-dimensional rendering that, when displayed by the first display of the first electronic device, includes at least some display content that is perceivable, at a location remote from the first display of the first electronic device, by a viewer of the first display of the first electronic device;
receive, by the first electronic device, a request to capture at least a portion of the display content displayed by the first display of the first electronic device, and to send at least the portion of the display content displayed by the first display of the first electronic device to a second electronic device;
generate, responsive to the request, a second rendering of the display content, the second rendering different from the first rendering of the display content; and
provide the second rendering to the second electronic device for two-dimensional viewing on a display of the second electronic device.

* * * * *